US012642196B2

(12) United States Patent
Van Zandt

(10) Patent No.: US 12,642,196 B2
(45) Date of Patent: Jun. 2, 2026

(54) SYSTEMS AND METHODS FOR DRONE-BASED GOLF COURSE MAINTENANCE

(71) Applicant: Eric Van Zandt, Houston, TX (US)

(72) Inventor: Eric Van Zandt, Houston, TX (US)

(73) Assignee: EVZ Golf Group, LLC, Houston, TX (US)

( * ) Notice: Subject to any disclaimer, the term of this patent is extended or adjusted under 35 U.S.C. 154(b) by 0 days.

(21) Appl. No.: 18/841,938

(22) PCT Filed: Feb. 27, 2023

(86) PCT No.: PCT/US2023/063363
§ 371 (c)(1),
(2) Date: Aug. 27, 2024

(87) PCT Pub. No.: WO2023/164701
PCT Pub. Date: Aug. 31, 2023

(65) Prior Publication Data
US 2025/0169405 A1    May 29, 2025

Related U.S. Application Data

(60) Provisional application No. 63/325,308, filed on Mar. 30, 2022, provisional application No. 63/314,740, filed on Feb. 28, 2022.

(51) Int. Cl.
A01G 20/30        (2018.01)
A01G 20/43        (2018.01)
(Continued)

(52) U.S. Cl.
CPC ............. *A01G 20/30* (2018.02); *A01G 20/43* (2018.02); *B64U 10/10* (2023.01); *B64U 20/87* (2023.01); *B64U 2101/00* (2023.01)

(58) Field of Classification Search
CPC ...... A01C 21/007; A01G 20/00; A01G 20/30; A01G 20/43; A63B 57/50; B64U 10/10; (Continued)

(56) References Cited

U.S. PATENT DOCUMENTS

| | | | |
|---|---|---|---|
| 3,771,794 A | 11/1973 | Crockett | |
| 5,277,425 A | 1/1994 | Petriano, Sr. | |
(Continued)

FOREIGN PATENT DOCUMENTS

| | | | | |
|---|---|---|---|---|
| CN | 214566164 U | * | 11/2021 | |
| CN | 215155673 U | * | 12/2021 | |
(Continued)

OTHER PUBLICATIONS

PCT International Search Report and Written Opinion mailed Aug. 15, 2023 (8 pages) in corresponding PCT application PCT/US2023/063363 filed Feb. 27, 2023.
(Continued)

*Primary Examiner* — Joshua E Rodden
(74) *Attorney, Agent, or Firm* — Patterson + Sheridan, LLP

(57)                ABSTRACT

Embodiments of a golf course maintenance drone include a housing and a wing assembly coupled to the housing, the wing assembly including a propeller that is configured to provide lift to the housing. In addition, the drone includes a golf course maintenance assembly coupled to the housing. The golf course maintenance assembly is configured to fill divots, repair pitch marks, rake bunkers, or collect debris on the golf course.

20 Claims, 20 Drawing Sheets

(51) Int. Cl.

| | | |
|---|---|---|
| *B64U 10/10* | (2023.01) | |
| *B64U 20/87* | (2023.01) | |
| *B64U 101/00* | (2023.01) | |

(58) Field of Classification Search
CPC ................ B64U 20/87; B64U 2101/00; B64U 2101/30; B64U 2101/40; B64U 2101/45; B64U 2101/47; E01C 23/01; E01H 1/00; G01N 33/245; G06T 2207/30188
USPC ........................................................ 244/17.13
See application file for complete search history.

(56) References Cited

U.S. PATENT DOCUMENTS

| | | | |
|---|---|---|---|
| 8,920,265 B1 | 12/2014 | Jones | |
| 2004/0048694 A1 | 3/2004 | Swensen et al. | |
| 2017/0151477 A1 | 6/2017 | Fallon et al. | |
| 2018/0364157 A1* | 12/2018 | Ghiraldi | ............... A01C 21/007 |

| | | | |
|---|---|---|---|
| 2020/0255148 A1 | 8/2020 | Singer | |
| 2020/0407059 A1 | 12/2020 | Kim | |
| 2021/0283475 A1 | 9/2021 | Tarrant | |
| 2021/0368696 A1 | 12/2021 | Friell et al. | |

FOREIGN PATENT DOCUMENTS

| | | | | | |
|---|---|---|---|---|---|
| CN | 218941951 U | * | 5/2023 | | |
| CN | 117048827 A | * | 11/2023 | ............... | B64D 1/16 |
| JP | 2018130065 | | 8/2018 | | |
| KR | 101328163 B1 | | 11/2013 | | |
| KR | 2020120168 A | * | 10/2020 | | |
| KR | 2528034 B1 | * | 5/2023 | | |
| WO | WO-2019086621 A1 | * | 5/2019 | ............. | A01G 20/47 |
| WO | WO-2021235634 A1 | * | 11/2021 | ............. | G06N 20/00 |

OTHER PUBLICATIONS

Partial Supplementary European Search Report issued to European Application No. 23761019.1 on Jan. 21, 2026 in 13 pages.

\* cited by examiner

700

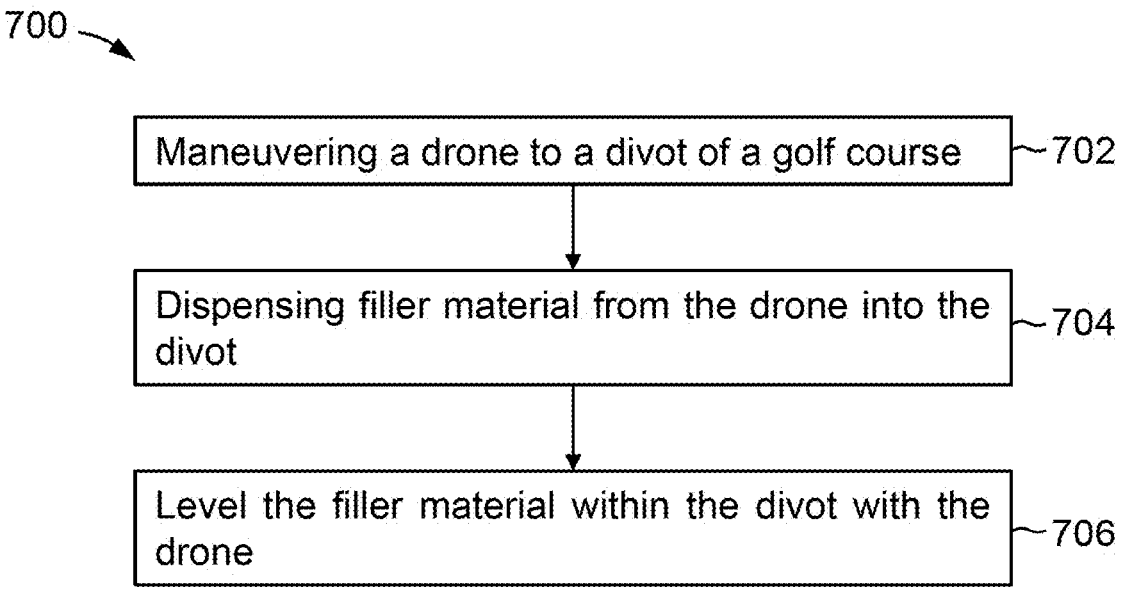

| Maneuvering a drone to a divot of a golf course | ~702 |

| Dispensing filler material from the drone into the divot | ~704 |

| Level the filler material within the divot with the drone | ~706 |

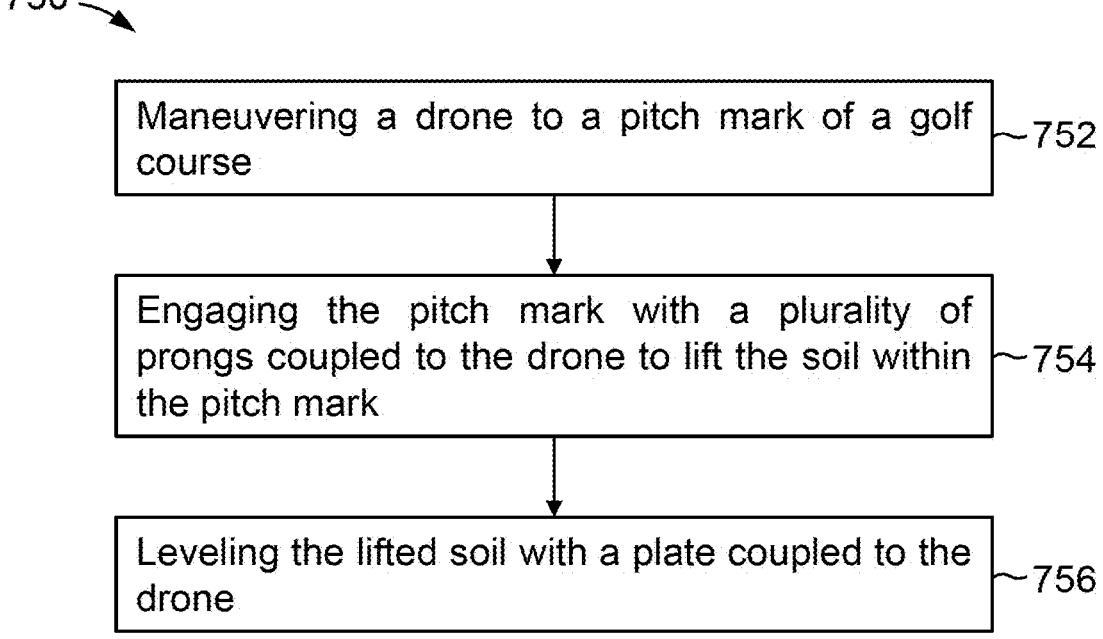

| Maneuvering a drone to a pitch mark of a golf course | ~752 |

| Engaging the pitch mark with a plurality of prongs coupled to the drone to lift the soil within the pitch mark | ~754 |

| Leveling the lifted soil with a plate coupled to the drone | ~756 |

SYSTEMS AND METHODS FOR DRONE-BASED GOLF COURSE MAINTENANCE

CROSS-REFERENCE TO RELATED APPLICATIONS

This application is a U.S. national stage entry under of, and claims priority to, PCT/US2023/063363, filed Feb. 27, 2023, and entitled "Systems and Methods for Drone-based Golf Course Maintenance," which claims priority to and the benefit of U.S. provisional patent application No. 63/314, 740, filed Feb. 28, 2022, and entitled "Automated Drone That Fills Divots on Golf Courses" and U.S. provisional patent application No. 63/325,308, filed Mar. 30, 2022, and entitled "Drone(s) That Automatically Fills Divots, Repairs Ball Marks, Rakes Bunkers, Retrieves Lost Clubs, Removes Debris, and Other Golf Maintenance," the contents of each being incorporated herein by reference in their entireties.

BACKGROUND

The game of golf is played on expansive courses that occupy a number of acres. Maintenance activities or tasks are undertaken on a golf course to maintain the quality and playability thereof. For instance, divots and pitch marks may be filled and/or repaired as appropriate, bunkers (sand traps) may be raked, and debris may be picked up and removed from the course. Failure to perform these sorts of maintenance tasks can significantly reduce the playing experience for golfers, who may have invested large sums of money for a club membership or to secure a tee time.

BRIEF SUMMARY

Some embodiments disclosed herein are directed to a golf course maintenance drone for performing (such as autonomously performing) maintenance tasks on a golf course. In some embodiments, the drone includes a housing. In addition, the drone includes a wing assembly coupled to the housing, the wing assembly including a propeller that is configured to provide lift to the housing. Further, the drone includes a golf course maintenance assembly coupled to the housing, wherein the golf course maintenance assembly is configured to fill divots, repair pitch marks, rake bunkers, or collect debris on the golf course.

Some embodiments disclosed herein are directed to a method including (a) flying a drone to a divot on a golf course, (b) dispensing filler material into the divot from a reservoir coupled to the drone, and (c) leveling the filler material in the divot with a leveling device coupled to the drone.

Some embodiments disclosed herein are directed to a method including (a) flying a drone to a bunker of a golf course, (b) deploying a sand rake away from a housing of the drone, and (c) dragging the sand rake within the bunker with the drone.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which:

FIGS. 22-25 are flow charts of methods of performing golf course maintenance tasks using a drone according to some embodiment disclosed herein.

DETAILED DESCRIPTION

As previously described, maintenance of a golf course may be essential to ensure the playability and quality of the course for golfers. Conventionally, crews of maintenance personnel may be employed to traverse through the course (e.g., during play or outside of playing hours) to perform various maintenance tasks to maintain the quality of the golf course. However, large maintenance crews add significantly to the operating costs for the golf course, and such a maintenance crew (depending on the knowledge, experience, and temperament of the particular personnel thereof) may not perform adequate maintenance on the course. In addition, depending on the number of golfers that play on a particular golf course per day, a maintenance crew may not be able to perform maintenance in the time allotted so that a golf course may experience a slow and steady degradation in quality over a period of time.

Accordingly, embodiments disclosed herein are directed to drones configured to perform golf course maintenance tasks. In some embodiments, the drones may include one or more tools and assemblies that may be used to autonomously perform golf course maintenance tasks such as, for instance, filling divots, fixing pitch or ball marks on the green, raking bunkers, and removing debris from the course. Thus, through use of the embodiments disclosed herein, golf course maintenance may be performed more efficiently and consistently without the need to hire and train a large maintenance crew.

Figure 1:
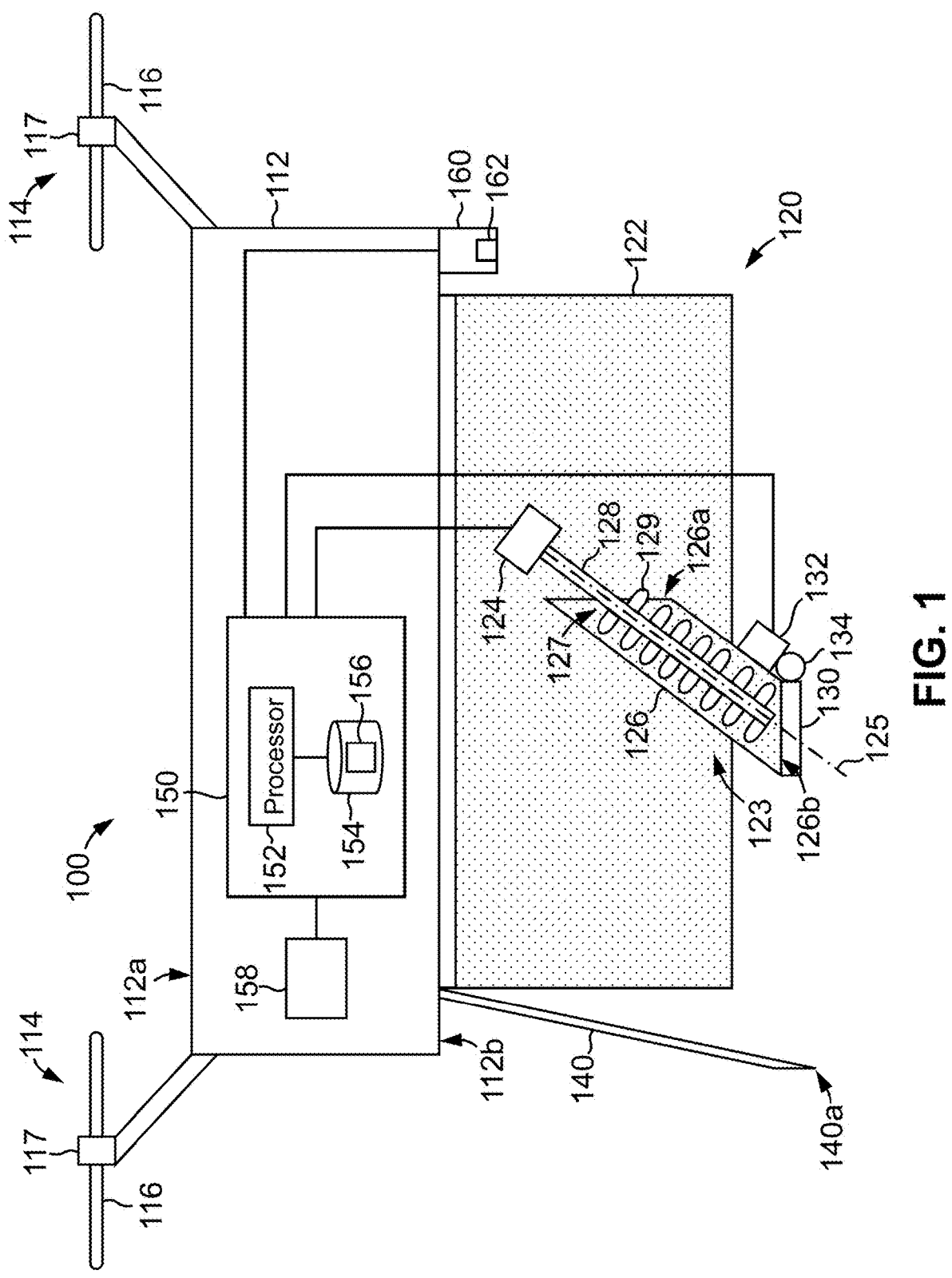
FIG. 1 is a schematic view of a golf maintenance drone according to some embodiments disclosed herein.

Referring now to FIG. 1, a golf maintenance drone 100 (or more simply "drone" 100) is shown according to some embodiments. As will be described in more detail below, the drone 100 may be configured to autonomously fill divots on a golf course during operations. As used herein a "divot" refers to a crater or depression in the ground that is formed when a section or portion of turf is removed as a result of contact between a golf club and the ground when a golfer swings the club.

The drone 100 includes a body or housing 112, and a plurality of wing assemblies 114 (or at least one wing assembly 100) coupled to and extending outward from the housing 112. Each of the plurality of wing assemblies 114 includes a propeller 116 connected to a motor or driver 117. During operations, the motors 117 may rotate propellers 116 in order to provide lift to the housing 112. Changing the relative speeds of the propellers 116 via the motors 117 may allow the housing 112 to be maneuvered in a 3-dimensional (3D) space. In some embodiments, a total of four wing assemblies 114 are coupled to the housing 112; however, other numbers (e.g., more than four and less than four) are contemplated in other embodiments.

The housing 112 may include a first or upper side 112a and a second or lower side 112b. The upper side 112a may correspond to the side of the housing 112 that may generally point or face upward (or away from the surface of the Earth) and the lower side 112b may correspond to the side of the housing 112 that may generally point or face downward (or toward the surface of the Earth) during operations. However, it should be appreciated that drone 100 may be operated such that the upper side 112a faces downward and the lower side 112b faces upward. Thus, the use of the terms "upper," "above," and the like, and "lower," "below," or the like is done for convenience and clarity and should not be interpreted as limiting all possible operations of drone 100 in various embodiments. In some embodiments, the plurality of wing assemblies 114 may be coupled to the housing 112 such that the propellers 116 may be positioned above the upper side 112a during operations.

A divot fill assembly 120 is coupled to the housing 112. Specifically, the divot fill assembly 120 is coupled to the lower side 112b of the housing 112 so that the divot fill assembly 120 may be generally positioned below the housing 112 during operations. Divot fill assembly 120 may include a reservoir 122 and a dispensing assembly 123.

The reservoir 122 includes a vessel or container that may hold a filler material for filling a divot on a golf course. For instance, in some embodiments, the filler material may comprise sand, dirt, grass seed, fertilizer, or a combination thereof. For convenience, the filler material that may be stored and dispensed from the reservoir 122 may be generally referred to as "sand." The reservoir 122 may be removably coupled to the housing 112 such that the reservoir 122 may be filled or emptied as appropriate. In some embodiments, the reservoir 122 may be permanently attached to the housing 112. In some embodiments, the reservoir 122 may include one or more doors or other openings (not shown) that may allow refilling or emptying of the reservoir 122 with or without detaching the reservoir 122 from the housing 112.

Referring still to FIG. 1, the dispensing assembly 123 includes a dispenser tube 126 and an auger (or screw) 127 for controllably advancing sand through the dispenser tube 126 during operations. The dispenser tube 126 includes a first or inlet end 126a and a second or outlet end 126b opposite inlet end 126a. The inlet end 126a is positioned within the reservoir 122 and the outlet end 126b is positioned outside of the reservoir 122.

The auger 127 includes a central shaft 128 and one or more helical vanes 129 connected to and extending outward from the central shaft 128. The shaft 128 includes a central or longitudinal axis 125, and the vane(s) 129 may extend both radially outward from the central shaft 128 and helically about the axis 125. The auger 127 may be inserted within the dispenser tube 126 from the inlet end 126a such that the vane(s) 129 may extend out to (or close to) the inner wall of the dispenser tube 126. The central shaft 128 may be coupled to a motor (or driver) 124. The driver 124 may include an electrical motor (e.g., servo motor, stepper motor, etc.) that may selectively rotate the central shaft 128 about axis 125 such that the vane(s) 129 may move the sand through the dispenser tube 126 from the inlet end 126a toward the outlet end 126b.

Figure 7:
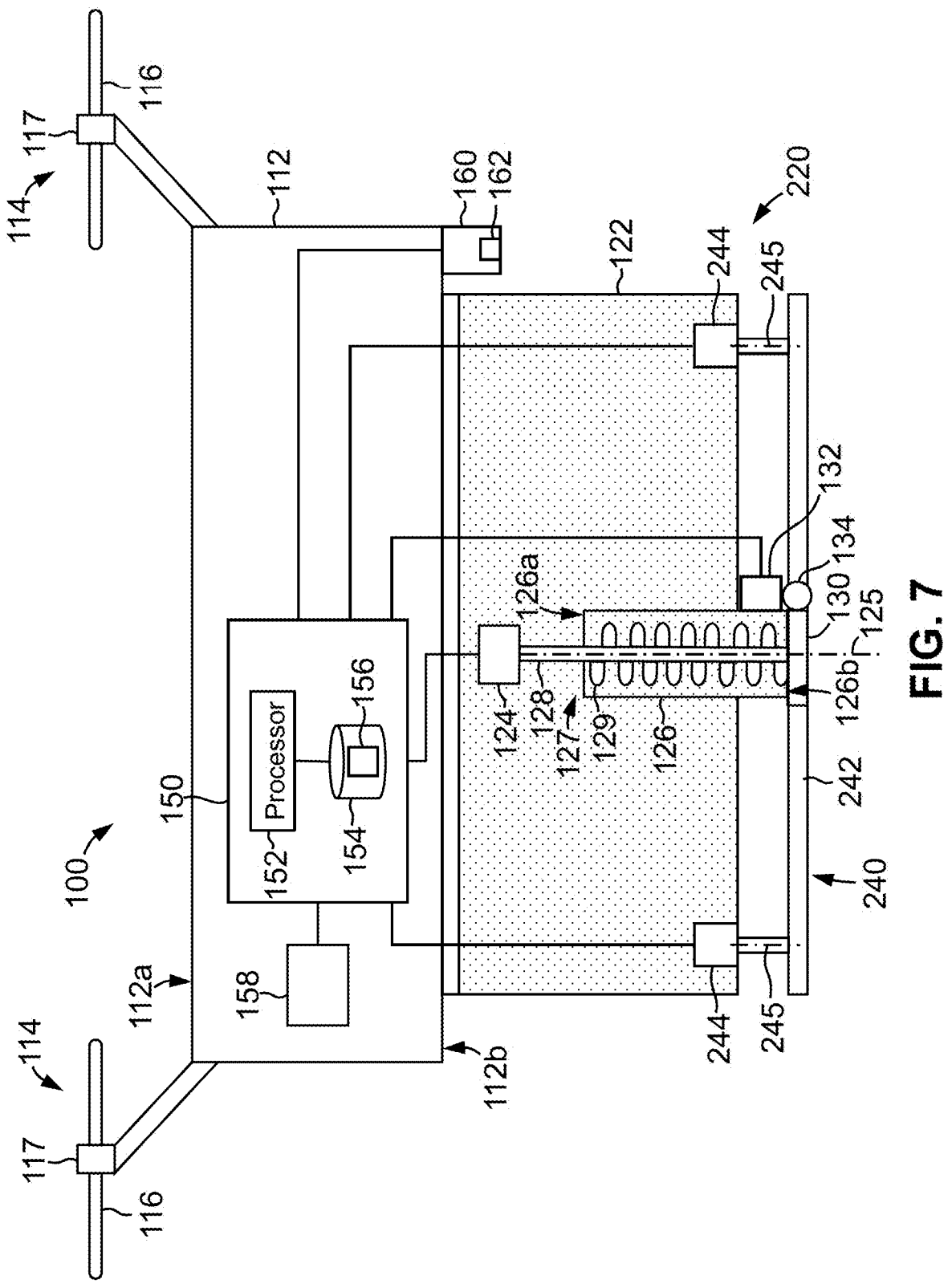
FIG. 7 is a schematic view of a golf maintenance drone according to some embodiments disclosed herein.

In some embodiments (such as the embodiment shown in FIG. 1), the dispenser tube 126 and auger 127 may be angled such that the axis 125 may be misaligned (e.g., at a non-zero angle) to the direction of gravity while drone 100 is flying above the ground during operations. Without being limited to this or any other particular theory, misaligning or angling the axis 125 (and thus the dispenser tube 126 and auger 127) relative to the direction of gravity may facilitate or encourage the flow of sand out of the reservoir 122 during operations. In some embodiments (e.g., such as shown in the embodiment of FIG. 7), the dispenser tube 126 and auger 127 may be angled such that the axis 125 is generally aligned with the direction of gravity while drone 100 is flying above the ground during operations.

In some embodiments, the shape and contours of the reservoir 122 may be configured to feed or direct all (or most) of the sand within the reservoir 122 toward the inlet end 126a of the dispenser tube 126. Thus, in some embodiments, the reservoir 122 may define a funnel or funnel-type shape that directs sand into the inlet end 126a of dispenser tube 126 via the force of gravity. As a result, in some embodiments, the reservoir 122 may be configured to dispense all (or substantially all) of the sand stored therein via the dispensing assembly 123.

A door (or cover) 130 is coupled to the outlet end 126b of the dispenser tube 126 that may be selectively rotated about a hinge 134 by a motor (or driver) 132. Specifically, the door 130 may be rotated by motor 132 about hinge 134 toward the outlet end 126b to a closed position in which the door 130 covers the outlet end 126*b* and prevents (or at least restricts) the release of sand from the dispenser tube 126. In addition, the door 130 may be rotated by the motor 132 about hinge 134 away from the outlet end 126*b* to an open position in which the outlet end 126*b* is open so that sand may freely flow out of the dispending tube 126 via the outlet end 126*b*.

The divot fill assembly 120 may include a leveling device 140 that may be used to level sand that is inserted into the divot during operations. In some embodiments, the leveling device 140 may comprise a skirt or flap of material that is coupled to the housing 112 and/or the reservoir 122. For instance, the leveling device 140 may comprise a flap of compliant material (e.g., an elastomer such as a rubber, or compliant polymer) that hangs below the reservoir 122 and outlet end 126*b* of dispenser tube 126. As will be described in more detail below, the leveling device 140 may be dragged across a filled divot to level the sand therein (e.g., so as to level the sand in the divot with the surrounding turf). In some embodiments, a distal end 140*a* of the leveling device 140 may include one or more weights or weighted components (e.g., weighted elongate bar) so as to ensure that distal end 140*a* is projected below the reservoir 122 and outlet end 126*b* of dispenser tube 126 via the force of gravity.

Referring still to FIG. 1, the drone 100 may also include an image sensor assembly 160 supported by the housing 112. The image sensor assembly 160 comprises one or more lenses and/or sensors for capturing images in visible light and/or non-visible light (e.g., infrared (IR) light). Thus, in some embodiment, image sensor assembly 160 may comprise a camera (or plurality of cameras). In some embodiments, the image sensor assembly 160 may capture still images, video, or both. Image sensor assembly 160 may be coupled to housing 112 such that the image sensor assembly 160 may capture images of the ground (or other objects) positioned below the drone 100 during operations. In some embodiments, the image sensor assembly 160 may include a plurality of cameras that are distributed and spaced about the housing 112 (e.g., such as the lower side 112*b* of housing 112).

In some embodiments, drone 100 may also include a proximity sensor 162 (e.g., a time or flight sensor) that is configured to measure or detect a distance between the drone 100 (e.g., housing 112) and an object of interest (e.g., the ground, a divot, debris, etc.). In some embodiments, the proximity sensor 162 may be incorporated within or coupled to the image sensor assembly 160, such as is schematically shown in FIG. 1. In some embodiments, the proximity sensor 162 may be coupled to the housing 112 separately from the image sensor assembly 160. In some embodiments, the proximity sensor 162 may be positioned and aligned so as to measure or detect a distance between the drone 100 and an object of interest along a line of sight of the image sensor assembly 160. For instance, in some embodiments, the proximity sensor 162 may measure or detect a distance from the drone 100 to an object of interest that is positioned in the center (or substantially in the center) of an image captured by the image sensor assembly 160.

In some embodiments, the proximity sensor 162 may measure or determine distance to an object of interest by outputting energy waves (e.g., sound waves, light waves, etc.). Specifically, the proximity sensor 162 may detect the reflection of the output energy waves off of the object of interest and note the time of flight of the output and reflected energy waves. Without being limited to this or any other theory, the time of flight of the output and reflected energy waves may be correlated to a linear distance given that the speed of the energy waves may be known (or determinable).

The drone 100 may also include a controller 150 positioned within the housing 112 that is communicatively coupled to various components thereof, such as the motors 124, 132, the image sensor assembly 160, the proximity sensor 162, and motors 117 of wing assemblies 114. Generally speaking, the controller 150 may comprise a computing device (e.g., a computer) that is configured to execute machine-readable instructions. For instance, the controller 150 may include a processor 152 and a memory 154.

The processor 152 may comprise any suitable processing device, such as a microcontroller, central processing unit (CPU), graphics processing unit (GPU), timing controller (TCON), scaler unit, etc. The processor 152 executes machine-readable instructions (e.g., machine-readable instructions 156) stored on memory 154, thereby causing the processor 152 to perform some or all of the actions and functionality attributed herein to the controller 150. In general, processor 152 fetches, decodes, and executes instructions (e.g., machine-readable instructions 156). In addition, processor 152 may also perform other actions, such as, making determinations, detecting conditions or values, etc., and communicating signals. If processor 152 assists another component in performing a function, then processor 152 may be said to cause the component to perform the function.

The memory 154 may comprise volatile storage (e.g., random access memory (RAM)), non-volatile storage (e.g., flash storage, read-only memory (ROM), etc.), or combinations of both volatile and non-volatile storage. Data read or written by the processor 152 when executing machine-readable instructions 156 can also be stored on memory 154. Memory 154 may comprise "non-transitory machine-readable medium," where the term "non-transitory" does not encompass transitory propagating signals.

The processor 152 may comprise one processing device or a plurality of processing devices that are distributed within controller 150 or more broadly within drone 100. Likewise, the memory 154 may comprise one memory device or a plurality of memory devices that are distributed within controller 150 or more broadly within drone 100. In some embodiments, one or more components of the controller 150 (e.g., processor 152, memory 154, etc.) may be positioned (or partially positioned) outside of the drone 100, such as at a central base station (e.g., at the club house or maintenance shed of the golf course).

Drone 100 may also include an onboard power source 158 that may provide electrical power to operate the various components of the drone 100 (e.g., motors 117, 124, 132, controller 150, image sensor assembly 160, proximity sensor 162, etc.). In some embodiments, the power source 158 may comprise one or more devices or systems that are configured to store electrical power such as, batteries, capacitors, or some combination thereof.

In some embodiments, the controller 150 (or portions thereof) may be communicatively coupled to a computing device (or controller) that is remote and separate from the drone 100 (or any of the other drones described herein). For instance, in some embodiments, controller 150 may communicate with a separate computing device (e.g., a server, desktop computer, tablet computer, smartphone, etc.) that is positioned remote and separate from the drone 100 and that may perform one or more of the analysis and determinations described herein (e.g., identification and location of divots, pitch marks, debris, etc., identifying bunkers in need of raking, etc.). The remote computing device may the command the controller 150 onboard the drone 100 to perform one or more tasks or operations as described herein.

Figure 2:
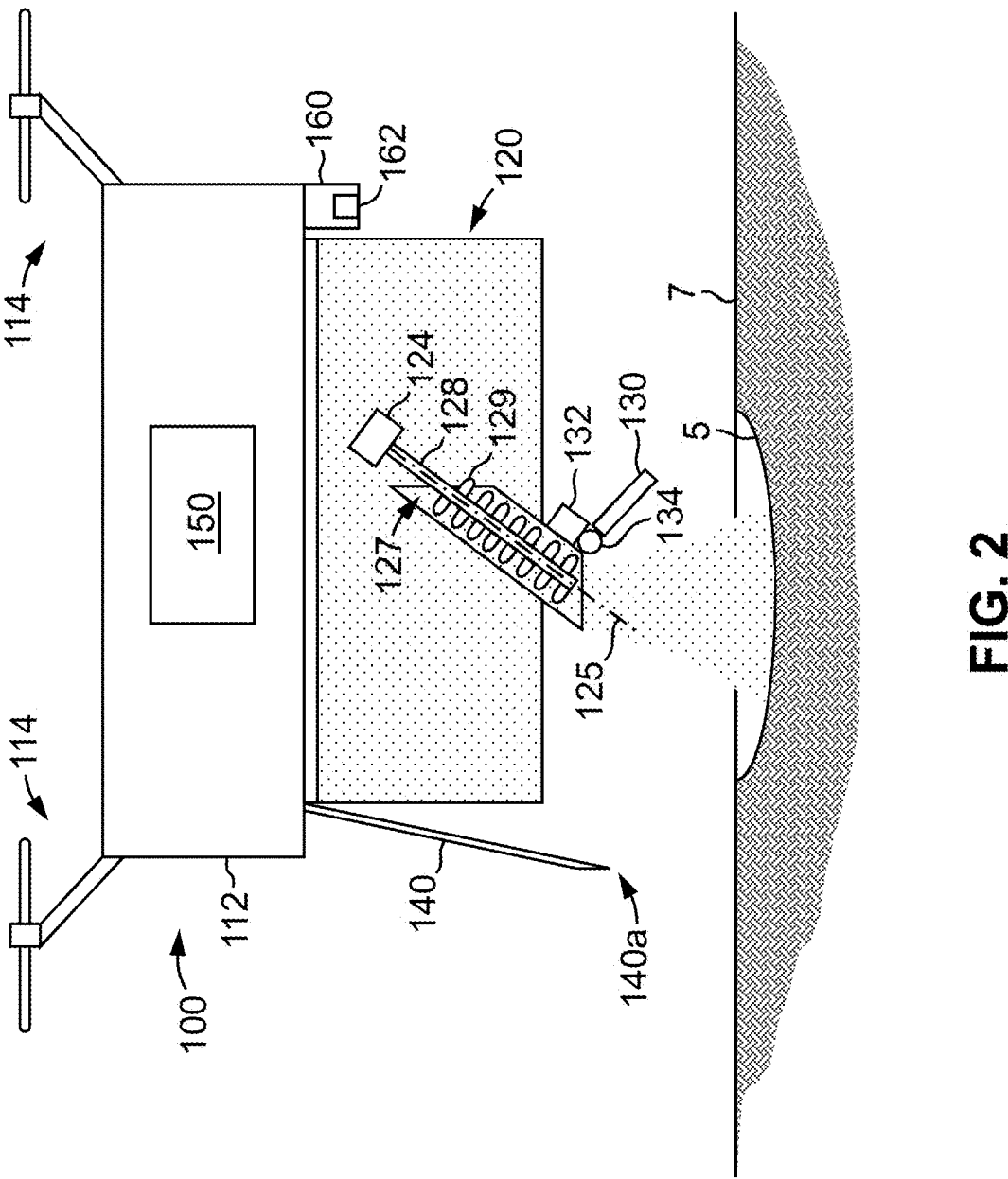
FIGS. 2-4 are sequential schematic views of the golf maintenance drone of FIG. 1 performing a divot filling operation according to some embodiments disclosed herein.
Figure 3:
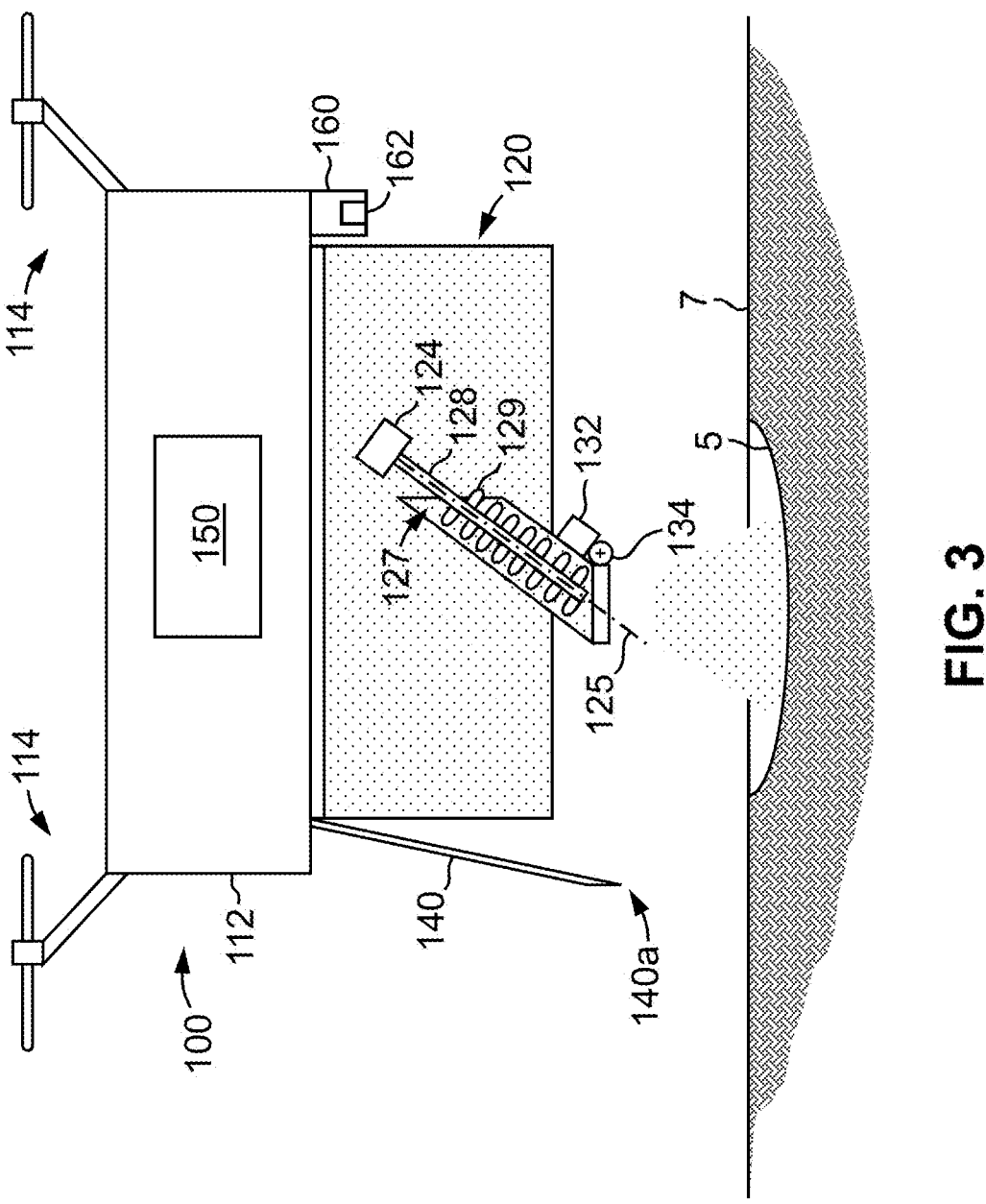
Figure 4:
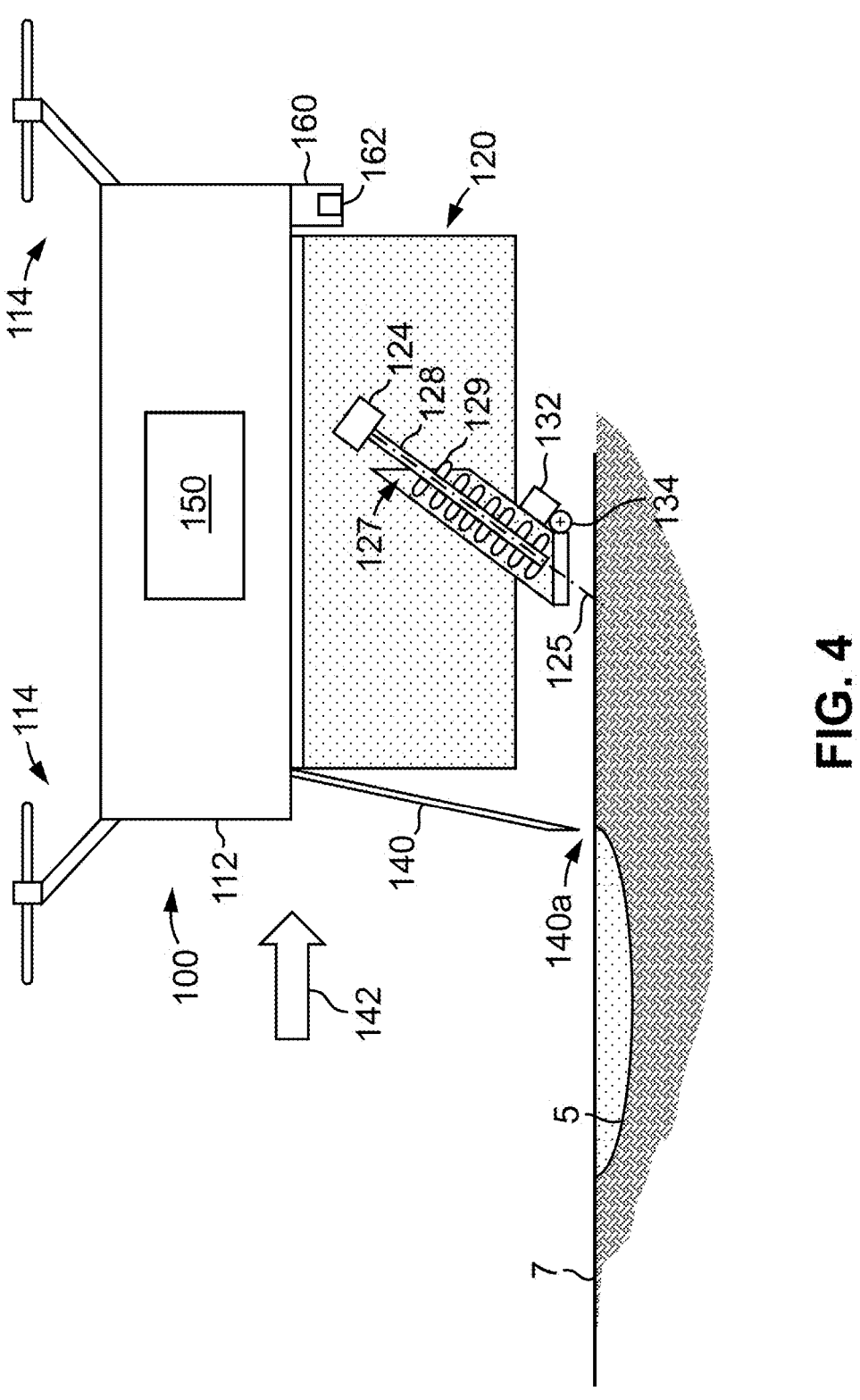

During operations, drone 100 may autonomously operate to locate and fill divots on the golf course. For instance, controller 150 may fly and maneuver the drone 100 to a divot on the golf course via the motors 117 and image sensor assembly 160, and then may fill the divot via the divot fill assembly 120. Specifically, FIGS. 2-4 show an example sequence for a divot filling operation using the drone 100 according to some embodiments. First, as shown in FIG. 1, the drone 100 may be maneuvered to a divot 5 in the turf 7 of a golf course via the wing assemblies 114. The controller 150 may maneuver the drone 100 such that the outlet end 126*b* of the dispenser tube 126 is generally aligned with the divot 5 (e.g., such as an approximate center of the divot 5). Thereafter, the controller 150 may actuate the divot fill assembly 120 to dispense sand into the divot 5. For instance, the controller 150 may actuate the motor 132 to open the door 130 and may actuate the motor 124 to rotate the auger 127 about the axis 125 and thereby dispense sand from the reservoir 122 out of the outlet end 126*b* of dispenser tube 126. The dispensed sand may fall into the divot 5 as shown in FIG. 3.

During these operations, the controller 150 may dispense a controlled or selected amount of sand so as to avoid under filling or overfilling the divot 5. For instance, in some embodiments, the controller 150 may dispense an amount of sand that may correspond with an average volume and/or size of a divot 5. In some embodiments, the controller 150 may determine the size of the divot 5 via images captured by the image sensor assembly 160 and/or an output from the proximity sensor 162. For instance, the controller 150 (particularly the processor 152 executing machine readable instructions 156) may determine the size (e.g., surface area) of the divot 5 based on a number of pixels that the divot 5 occupies in image(s) captured by the image sensor assembly 160 and/or may determine depth of the divot 5 based on a distance between the drone 100 (or a component thereof) and the bottom (or a bottom surface) of the divot 5 via the proximity sensor 162. The determined size and/or the depth of the divot 5 may then be used by the controller 150 to determine a volume of sand for filling the divot 5.

The controller 150 may dispense a desired amount of sand from the outlet end 126*b* of dispenser tube 126 by selecting or controlling the number of rotations of the auger 127 about the axis 125 via the motor 124 during operations. For instance, each rotation of the auger 127 about the axis 125 may correspond to an approximate volume of sand dispensed from the outlet end 126*b* of dispenser tube 126 (e.g., based on the size—such as the diameter, thickness, etc.— and pitch of the vane(s) 129 and the size—such as an inner diameter—of the dispenser tube 126). Thus, the controller 150 may actuate the motor 124 (which may comprise a servo motor or stepper motor in some embodiments as previously described) to rotate the auger 127 a selected number of times about the axis 125 to dispense a selected amount of sand into the divot 5 during operations. In some embodiments, the controller 150 may dispense a selected amount of sand by rotating auger 127 via motor 124 for a selected amount of time.

As shown in the sequence from FIG. 2 to FIG. 3, once the sand is dispensed into the divot 5 from the divot fill assembly 120, the controller 150 may actuate the motor 132 to close the door 130 to prevent (or at least restrict) additional sand from flowing or falling out of the dispenser tube 126. Thereafter, as shown in FIG. 4, the controller 150 may maneuver the drone 100 so that the leveling device 140

(particularly the distal end 140*a*) is drug across the sand within the divot 5 (e.g., see arrow 142 in FIG. 4 indicating a direction of movement of the drone 100 when dragging the leveling device 140 across the sand within divot 5) so as to level the sand within the divot. In some embodiments, the leveling device 140 may level the sand with the turf 7 surrounding the divot 5. While the arrow 142 indicates a single direction of movement of the drone 100 across the divot to drag the leveling device 140 across the sand dispensed therein, it should be appreciated that the drone 100 may drag the leveling device 140 across the divot 5 multiple times and in multiple directions (e.g., such as along the arrow 142 and opposite the arrow 142) in order to level the sand within the divot 5 during operations.

Figure 5:
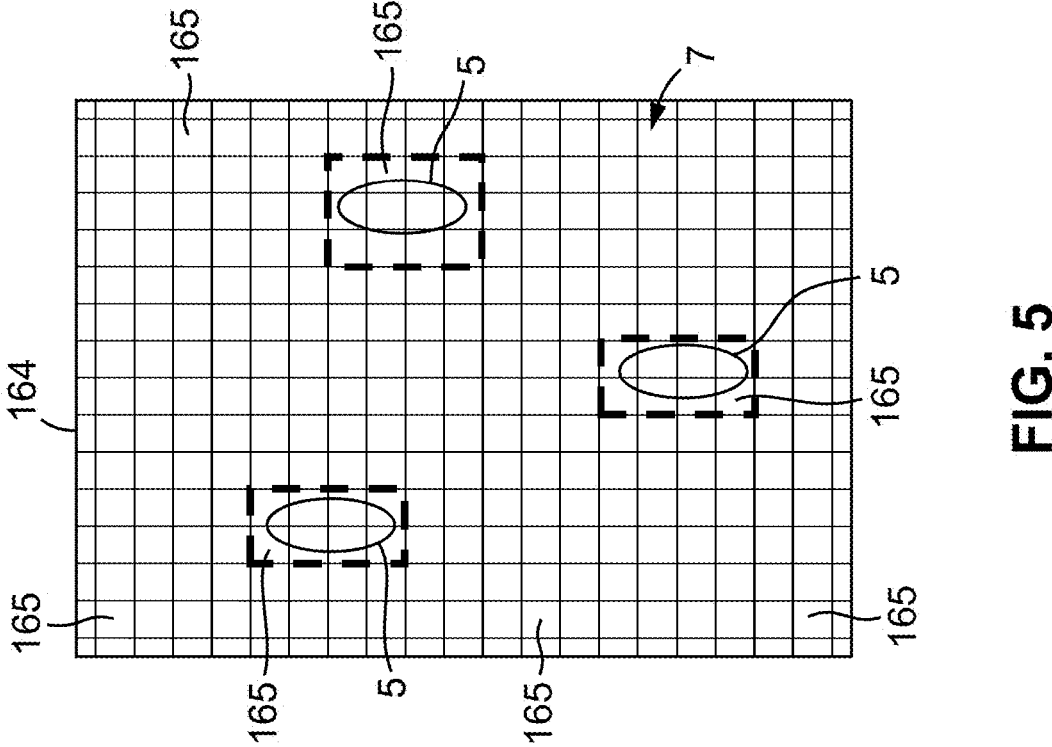
FIG. 5 is an example image captured by an image sensor assembly of the golf maintenance drone of FIG. 1 according to some embodiments disclosed herein.

During operations, the controller 150 may locate one or more divots 5 on the turf of a golf course using images captured by the image sensor assembly 160. For instance, in some embodiments, the controller 150 may utilize a machine learning model (e.g., a neural network, logistic regression model, classification model, etc.) to detect and recognize divots 5 in the images captured by the image sensor assembly 160. FIG. 5 shows an example image 164 captured by the image sensor assembly 160 of drone 100 (FIG. 1) according to some embodiments. The image 164 shows a portion or section of turf 7 on the golf course, such as along a fairway or tee box of the golf course. The image 164 includes a plurality of pixels 165 arranged in a grid pattern. The number of pixels 165 in the image 164 may determine a resolution of the image 164.

As shown in FIG. 5, the image 164 includes a plurality of divots 5 positioned on the section of turf 7. As previously described, the divots 5 may correspond to craters or depressions in the ground that are formed when a section or portion of the turf 7 is removed as a result of contact between a golf club and the ground when a golfer swings the club. As a result, the divots 5 may correspond with areas where the dirt or soil underlying the turf 7 is visible from above. Thus, the color, brightness, and/or contrast of pixels 165 in the image 164 that include the divots 5 may be different and distinguishable from the color, brightness, and/or contrast of pixels 165 in the image 164 that include the turf 7. Thus, the controller 150 may locate the divots 5 by analyzing the color, brightness, and/or contrast the pixels 165 within the image 164 and determining which pixels 165 or groups of pixels 165 may be associated with a divot based thereon. Specifically, the controller 150 may compare a brightness level and/or contrast of each pixel 165 with a predetermined value or value range which may be associated with an expected brightness level and/or contrast of pixels 165 that include turf 7. When a brightness level and/or contrast is different from the predetermined value (or falls outside the predetermined value range), the controller 150 may determine that the pixels associated with these divergent brightness levels and/or contrast values may indicate the presence of a divot 5. In some embodiments, the controller 150 may identify and locate a divot 5 in the image 160 when a predetermined number (e.g., a minimum number) of adjacent pixels 164 include a brightness level and/or contrast that would indicate (e.g., based on a comparison with the predetermined value and/or value range as previously described) the presence of a divot 5.

After controller 150 identifies and locates divots 5 within the image 164, the controller 150 may then maneuver the drone 100 and actuate the divot filling assembly 120 to fill each of the divots 5 as previously described (FIGS. 2-4). In some embodiments, the controller 150 may locate the identified divots 5 in the image 164 using a global positioning system (GPS), and thus may include a GPS antenna (not shown) for communicating with the GPS system during operations. In addition, the controller 150 may utilize a map (such as a 3D map as described below) of the golf course to navigate throughout the course and locate and identify divots 5 during operations. For instance, the controller 150 may utilize the detailed information available in such a map (e.g., elevation, distances, positions of course hazards, fairways, greens, tee boxes, etc.) to detect the presence of anomalies which may indicate a divot 5 (or other anomaly as described herein).

In some embodiments, the controller 150 may identify an approximate center of each divot 5 identified in the image 164. For instance, in some embodiments, the controller 150 may identify pixel 165 of the group of pixels 165 associated with an identified divot 5 as being or including a midpoint of the divot 5 (e.g., such as a point that is mid-way between the perimeter edges of the divot in the length and width directions). The controller 150 may determine that the identified pixel 165 including the midpoint corresponds with the approximate center of the divot 5, and the controller 150 may maneuver the drone 100 so that the proximity sensor 162 may measure or detect a depth of the divot 5 at the midpoint (which may correspond with the approximate lowest depth of the divot 5 as previously described). The controller 150 may determine an amount of sand to fill into the divot 5 based on the size (based on the number of pixels 165 depicting the divot 5 in the image 164) and the approximate depth of the divot 5 as previously described. In some embodiments, when the drone 100 is capturing the image 164 (or images 164) of the turf 7 for purposes of identifying and locating the divots 5, the controller 150 may maneuver the drone 100 over the turf at a predetermined height or altitude above the ground (which may be monitored and verified using the proximity sensor 162). Without being limited to any particular theory, by flying and maneuvering the drone 100 at a substantially constant and known altitude, the pixels 165 of image 164 may correspond with a known surface area size on the turf 7 so that controller 150 may more accurately identify divots 5 (e.g., based on an average, known size of the divots 5) in the image 164 as previously described.

Figure 6:
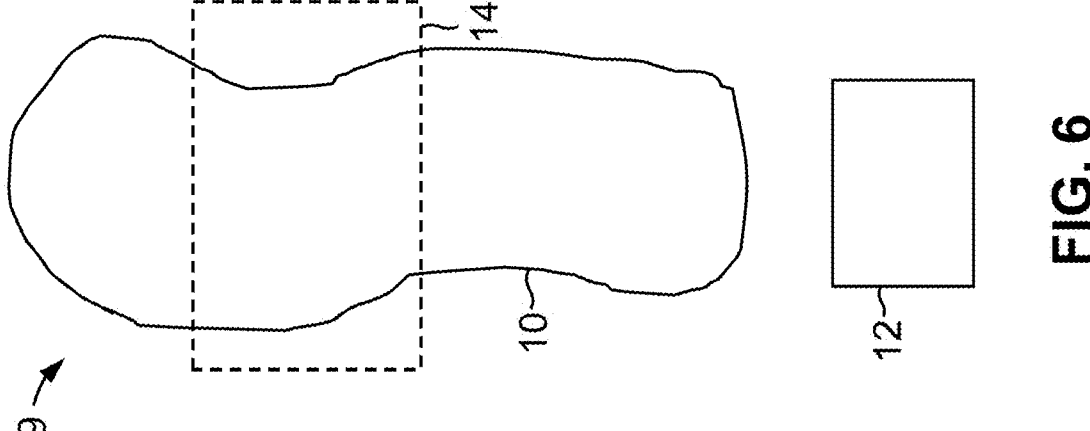
FIG. 6 is a schematic depicture of the example portions of a hole on a golf course that the golf maintenance drone of FIG. 1 may perform divot filling operations on according to some embodiments disclosed herein.

In some embodiments, the drone 100 may capture images of an entire golf course via the image sensor assembly 160 to identify and locate divots 5 as previously described. However, in some embodiments, the drone 100 may capture images of selected portions or regions of the golf course via the image sensor assembly 160 to identify and locate the divots 5 as previously described. For instance, as shown in FIG. 6, in some embodiments, the drone 100 may maneuver over portions of the holes (or a single hole) of the golf course, such as a fairway 10 and tee box 12, to identify and locate divots 5. In some embodiments, the drone 100 may maneuver over a selected portion of the fairway 10 that may correspond with one or more estimated landing zones for shots taken from the tee box 12. For instance, on average, a golfer may drive the golf ball between 100 and 400 yards from the tee box 12. Therefore, the drone 100 may limit divot 5 identification and location operations (previously described) to a region or section 14 of the fairway 10 that may correspond with this average driving distance. In some embodiments, the drone 100 may also perform divot 5 identification and location operations on the tee box 12 as well (e.g., such as when the golf hole 9 is a par 3 or is of a length that a golfer may drive the ball using an iron).

Referring now to FIG. 7, another golf maintenance drone 200 (or more simply "drone" 200) is shown according to some embodiments. As was previously described for the drone 100, the drone 200 may be configured to autonomously fill divots on a golf course during operations. The drone 200 may include a number of shared features and components with the drone 100. These shared components are identified in the drawings with the same reference numerals and are the same as previously described above for drone 100. In addition, the description below will generally focus on the features of drone 200 that are different from the drone 100.

Specifically, in some embodiments the drone 200 includes the housing 112, wing assemblies 114, controller 150, image sensor assembly 160, and proximity sensor 162 each being as previously described above. In addition, drone 200 includes a divot fill assembly 220 in place of the divot fill assembly 120 previously described. The divot fill assembly 220 includes the reservoir 122, the dispenser tube 126, and auger 127, each generally the same as previously described, except the dispenser tube 126 and auger 127 are positioned and aligned such that the axis 125 is generally aligned with the direction of gravity when the drone 200 is flying above the ground during operations.

In addition, the drone 200 also incudes a leveling device 240 in place of the leveling device 140 previously described (FIG. 1). The leveling device 240 includes a flat or planar plate 242 that is suspended below the reservoir 122 via a one or more (e.g., a plurality of) linear actuators 244. The linear actuators 244 may comprise any suitable actuator or driver that may extend and retract along a corresponding axis 245, which may extend downward (and generally along the direction of gravity). Thus, the axes 245 of actuators 244 may be parallel to the axis 125 of dispenser tube 126. Thus, during operations, the linear actuators 244 may actuate so as to selectively translate the pate 242 of leveling device 240 up and down along the axes 245. In some embodiments, the linear actuators 244 may comprise pneumatic actuators, electric motors, hydraulic actuators, etc.

The dispenser tube 126 may be coupled to the leveling device 240 so that the door 130 (or a bottom or outer surface thereof) is flush or co-planar with a lower surface of the plate 242 of leveling device 240, when the door 130 is in the closed position (e.g., such as shown in FIG. 7). Thus, during operations, when the plate 242 is reciprocated via the linear actuators 244, the dispenser tube 126 and door 130 may also reciprocate along with the plate 242. The linear actuators 244 may be communicatively coupled to the controller 150 so that controller 150 may selectively reciprocate the plate 242 via the linear actuators 244 during operations.

Figure 8:
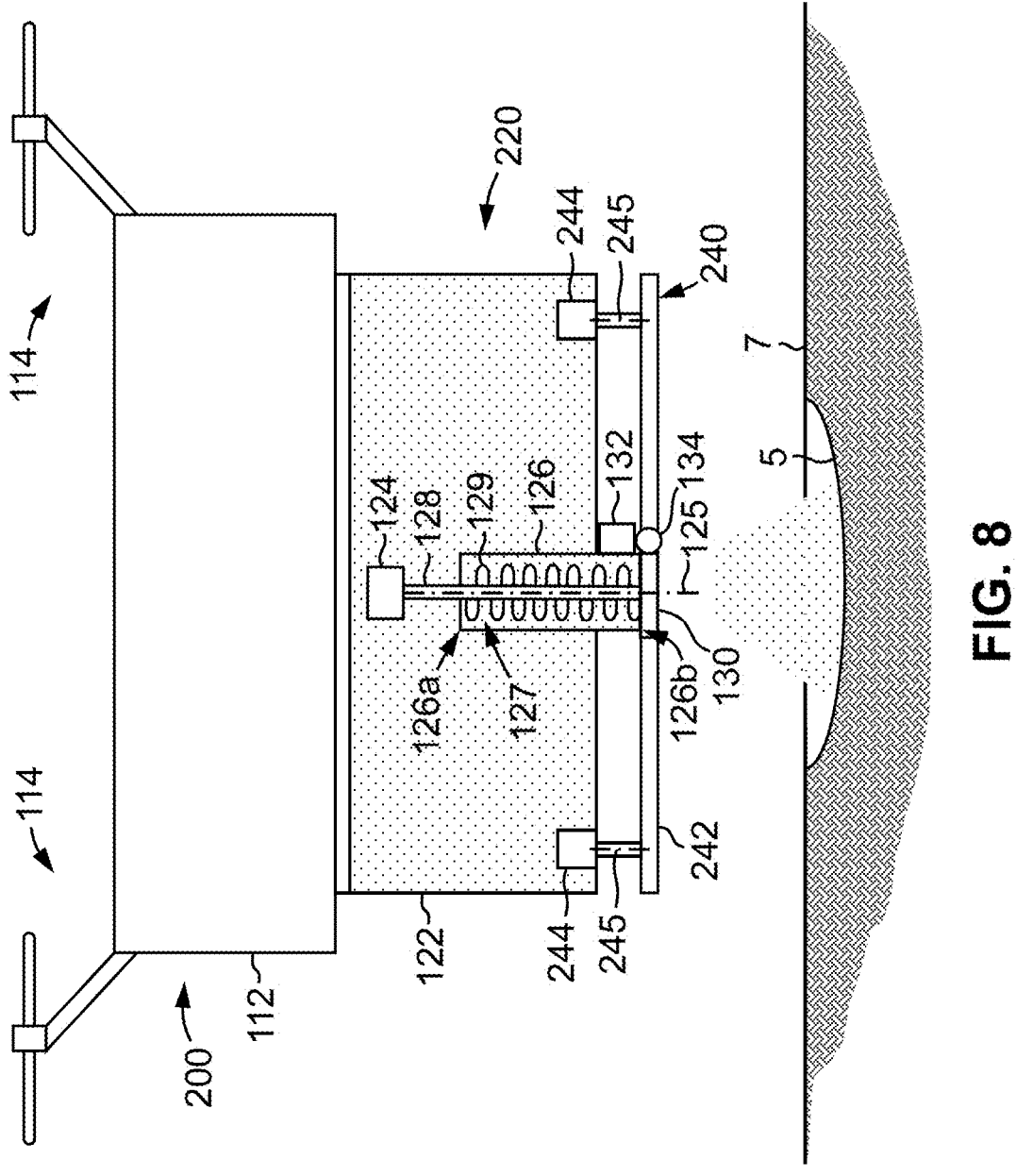
FIGS. 8-10 are sequential schematic views of the golf maintenance drone of FIG. 7 performing a divot filling operation according to some embodiments disclosed herein.
Figure 9:
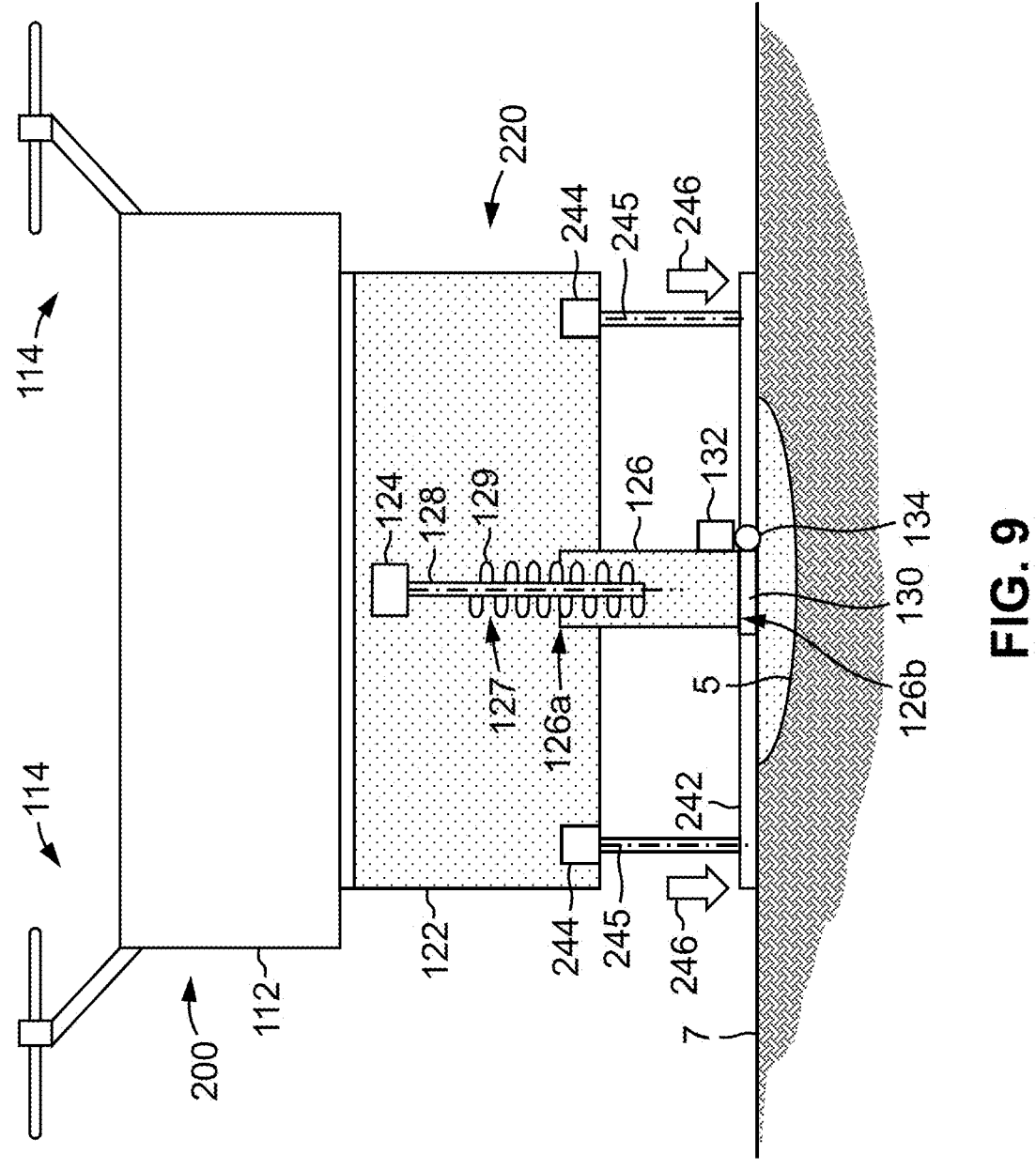
Figure 10:
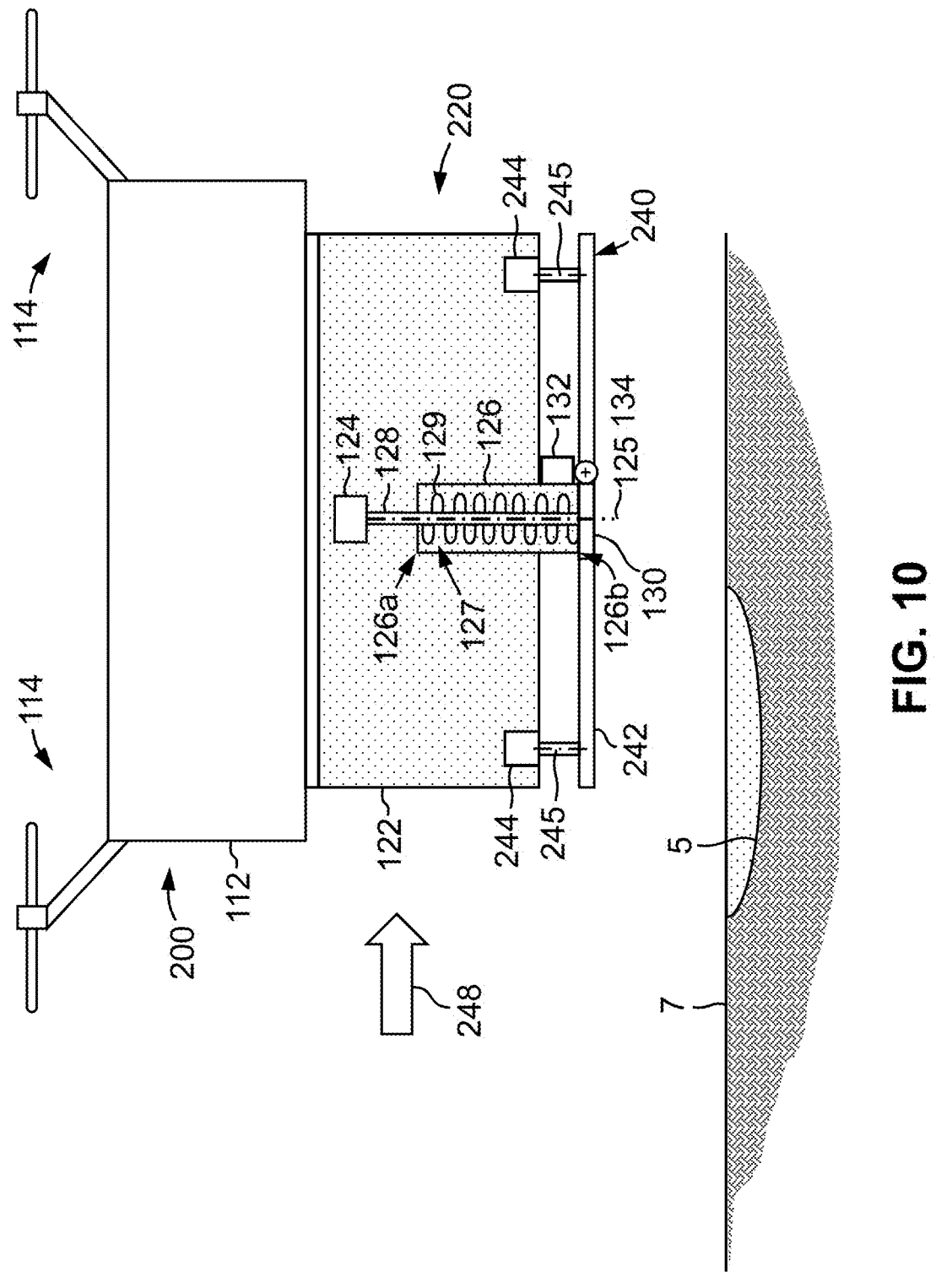

During operations drone 200 may autonomously operate to locate and fill divots on the golf course. For instance, controller 150 may fly and maneuver the drone 200 to a divot on the golf course via the motors 117 and image sensor assembly 160, and then may fill the divot via the divot fill assembly 220. Specifically, FIGS. 8-10 show an example sequence for a divot filling operation using the drone 200 according to some embodiments. First, as shown in FIG. 8, the controller 150 of drone 200 may maneuver the drone 200 to a divot 5 in the turf 7 of a golf course via the wing assemblies 114, and may actuate the motors 124, 132 to open the door 130 and dispense sand into the divot 5 from the reservoir 122 in generally the same manner as previously described above for drone 100. The drone 200 may locate and identify the divot 5 via the controller 150, image sensor assembly 160, and proximity sensor 162 as previously described.

As shown in FIG. 9, once the sand is dispensed into the divot 5 from the divot fill assembly 220, the controller 150 may actuate the motor 132 to close the door 130 to prevent (or at least restrict) additional sand from flowing or falling out of the dispenser tube 126. Thereafter, the controller 150 may maneuver the drone 100 and actuate the linear actuators 244 so as to lower the plate 242 of leveling device 240 (along arrows 246 in FIG. 9) into contact with the sand within the divot 5. In particular, the plate 242 may be lowered (via linear actuators 244) until plate 242 also contacts the turf 7 surrounding divot 5 so that the sand may be tamped down and leveled within the divot 5, and particularly leveled with the surrounding turf 7. In some embodiments, the plate 242 may be lowered (or reciprocated) a plurality of times to ensure that the sand is sufficiently leveled within the divot 5 during operations. As may be appreciated from the sequence from FIGS. 8 and 9, the dispenser tube 126 and motor 132 may reciprocate along with the plate 242 of the leveling device 240 during these operations. As shown in FIG. 10, once the sand is filled and leveled within the divot 5, the drone 200 may be flown away from the filled divot 5 (e.g., to fill another divot 5, to return a landing location, etc.) such as along arrow 248.

Figure 11:
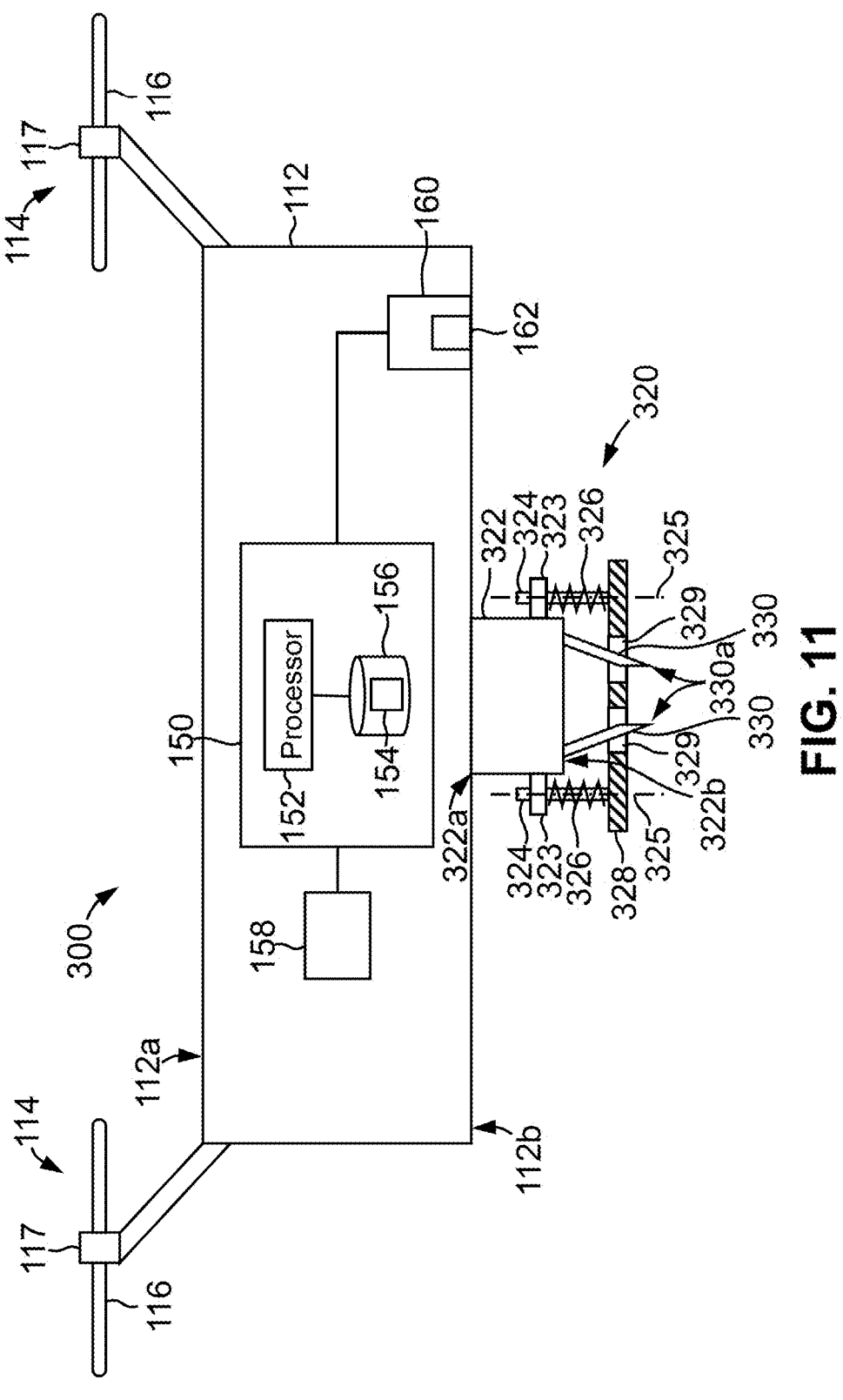
FIG. 11 is a schematic view of a golf maintenance drone according to some embodiments disclosed herein.

Referring now to FIG. 11, another golf maintenance drone 300 (or more simply "drone" 300) is shown according to some embodiments. As will be described in more detail below, the drone 300 may be configured to autonomously repair pitch marks (or ball marks) on a green (or putting surface) of a golf course during operations. The drone 300 may include a number of shared features and components with the drones 100, 200. These shared components are identified in the drawings with the same reference numerals and are the same as previously described above for drones 100, 200. In addition, the description below will generally focus on the features of drone 300 that are different from the drones 100, 200.

Specifically, in some embodiments the drone 300 includes the housing 112, wing assemblies 114, controller 150, image sensor assembly 160, and proximity sensor 162 each being as previously described above. In addition, drone 300 includes a pitch mark repair assembly 320 coupled to the lower side 112*b* of housing 112. As will be described in more detail below, the pitch mark repair assembly 320 is configured to repair pitch marks that are formed on a green or putting surface of a golf course. As used herein a "pitch mark" refers to a crater or depression in the green of a golf course that is formed by the compaction of the ground that occurs when a golf ball lands on the green during play.

The pitch mark repair assembly 320 includes a body 322 that is coupled to and extends outward from the lower side 112*b* of the housing 112. In particular, the body 322 may include a first or proximal end 322*a* that is connected to the lower side 112*b* of housing 112 and a second or distal end 322*b* that is projected away from the proximal end 322*a* and lower side 112*b* of housing 112.

In addition, the pitch mark repair assembly 320 includes a compression plate 328 that is coupled to a plurality of brackets 323 coupled to the body 322 via a plurality of connector rods 324. The rods 324 may each include a central or longitudinal axis 325 that are substantially aligned with the direction of gravity when drone 300 is flying over the ground during operations. The rods 324 may slide within the brackets 323 such that the position of the compression plate 328 may be adjusted relative to body 322 and housing 112 along the axes 325 during operations. Biasing members 326 (which may comprise coiled springs) may be positioned about the rods 324 and abutted between the brackets 323 and compression plate 328. During operations, the biasing members 326 may bias the compression plate 328 axially away from the body 322 along the axes 325.

A plurality of prongs 330 are coupled to and extend outward from the distal end 322*b* of the body 322. The prongs 330 may include distal ends 330*a* that are angled such that they converge inward toward one another. Each the prongs 330 may extend through corresponding apertures 329 in the compression plate 328 so that the distal ends 330*a* are positioned below the compression plate 328.

During operations drone 300 may autonomously operate to locate and repair pitch marks on the golf course. For instance, controller 150 may fly and maneuver the drone 300 to a pitch mark on the green of a golf course via the motors 117 and image sensor assembly 160, and then may engage pitch mark with the pitch mark repair assembly 320 to repair the pitch mark on the green. Specifically, FIGS. 12 and 13 show an example sequence for a pitch mark repair operation using the drone 300 according to some embodiments.

Figures 12, 13:
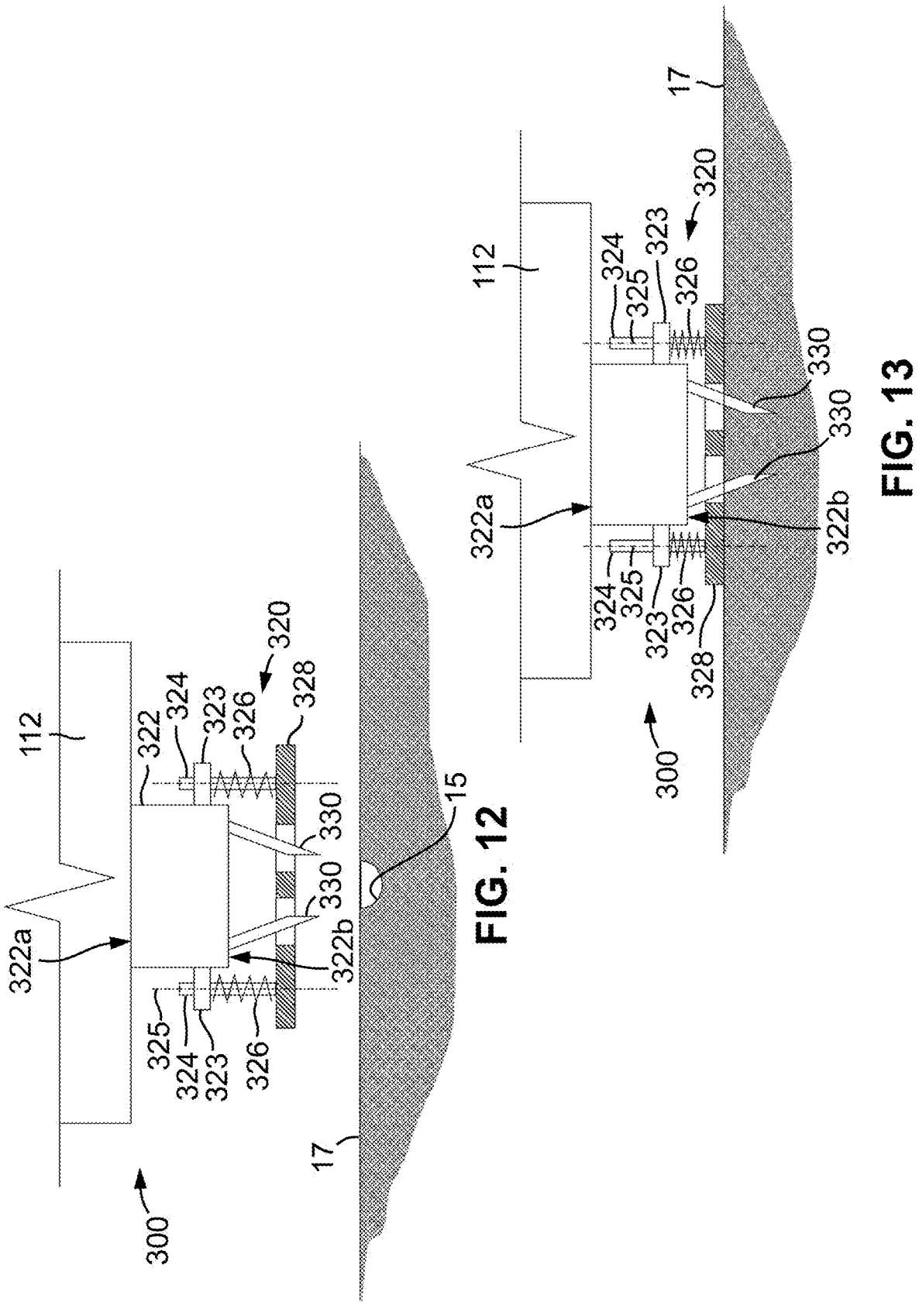
FIGS. 12 and 13 are sequential schematic views of the golf maintenance drone of FIG. 11 performing a pitch mark repair operation according to some embodiments disclosed herein.

First, as shown in FIG. 12, the drone 300 may be maneuvered to a pitch mark 15 in the green 17 of a golf course via the wing assemblies 114. The controller 150 may maneuver the drone 300 such that the prongs 330 of the pitch mark repair assembly 320 surround the pitch mark 15.

Thereafter as shown in the sequence from FIG. 12 to FIG. 13, the controller 150 may drop the drone 300 (via wing assemblies 114) toward the green 17 to drive the prongs 330 into the green 17 about the pitch mark 15. Because the distal ends 330*a* of prongs 330 are angled inward toward one another (FIG. 11), as the prongs 330 are driven into green, the prongs 330 may lift the soil under and surrounding the pitch mark 15 upward. Simultaneously, the compression plate 328 may be brought into contact with the green 17 surrounding the pitch mark 15 so that as the soil is lifted via the prongs 330 as previously described, the lifted soil may be leveled with the surrounding green 17 via the compression plate 328. Thus, by pushing the pitch mark repair assembly 320 into the surface of the green 17, the pitch mark 15 may be repaired so that an even putting surface is restored at the previous location of the pitch mark 15.

During operations, the controller 150 may locate one or more pitch marks 15 on the green 17 using images captured by the image sensor assembly 160 in a similar manner to that described above in which the drone 100 (FIG. 1) locates and identifies the divots 5 (FIG. 5). For instance, in some embodiments, the controller 150 may utilize a machine learning model (e.g., a neural network, logistic regression model, classification model, etc.) to detect and recognize pitch marks 15 in the images captured by the image sensor assembly 160. Because the pitch marks 15 may represent depressions or craters in the otherwise generally uniform surface of the green 17, shadowing within the pitch marks 15 may make them appear darker than the surrounding surface of the green 17. As a result, the color, brightness, and/or contrast of pixels (e.g., pixels 165 shown in FIG. 5) in the image(s) of the green 17 captured by the image sensor assembly 160 that include the pitch marks 15 may be different and distinguishable from the color, brightness, and/or contrast of pixels in the image(s) that include the turf 7. Thus, the controller 150 may locate the pitch marks 15 by analyzing the color, brightness, and/or contrast of the pixels within the image(s) captured by image sensor assembly 160 so as to identify and locate the pitch marks 15 on the green 17 in a similar manner to that described above for the divots 5 (e.g., by identifying pixels or a minimum group of adjacent pixels within the captured image that have a brightness level or contrast that is outside of a predetermined range for normal turf on the green 17).

After controller 150 divots 5 identifies and locates pitch marks 15 within the image 164, the controller 150 may then maneuver the drone 300 to repair the identified and located pitch marks 15 via the pitch mark repair assembly 320 as previously described (FIGS. 12 and 13). As was previously described above for the drone 100 when identifying and locating divots 5, in some embodiments, the controller 150 may locate the identified pitch marks 15 on the green 17 (via image(s) captured by the image sensor assembly 160) using a global positioning system (GPS), and thus may include a GPS antenna (not shown) for communicating with the GPS system during operations. In addition, the controller 150 may utilize a map (such as a 3D map as described below) of the golf course to navigate throughout the course and locate and identify pitch marks 15 during operations. For instance, the controller 150 may utilize the detailed information available in such a map (e.g., elevation, size, slope, etc. of the green) to detect the presence of anomalies which may indicate a pitch mark 15 (or other anomaly as described herein).

Figure 14:
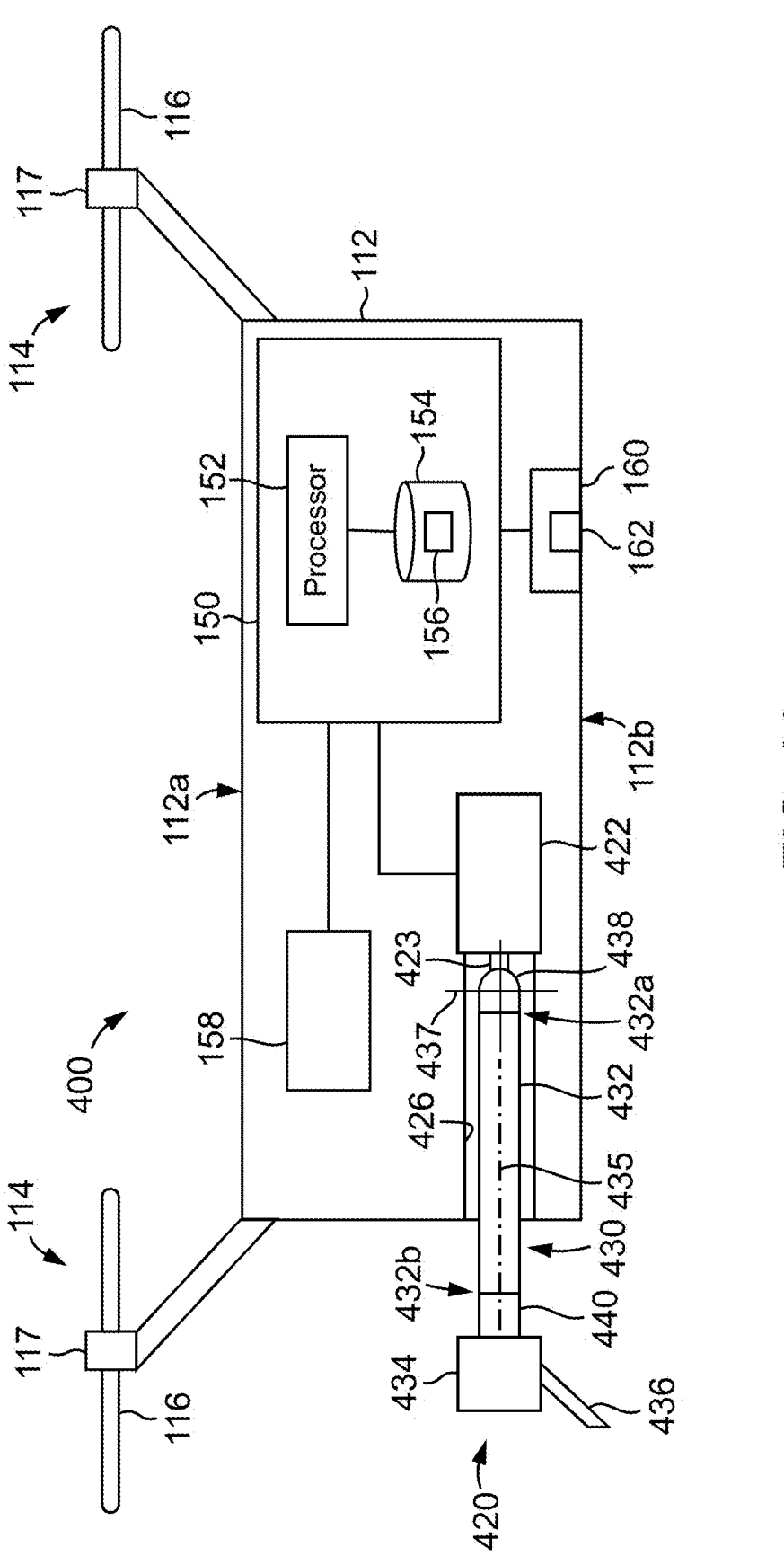
FIG. 14 is a schematic view of a golf maintenance drone having a sand rake assembly in a stowed position according to some embodiments disclosed herein.

Referring now to FIG. 14, another golf maintenance drone 400 (or more simply "drone" 400) is shown according to some embodiments. As will be described in more detail below, the drone 400 may be configured to autonomously rake a bunker (or sand trap) of a golf course during operations. The drone 400 may include a number of shared features and components with the drones 100, 200, 300. These shared components are identified in the drawings with the same reference numerals and are the same as previously described above for drones 100, 200, 300. In addition, the description below will generally focus on the features of drone 400 that are different from the drones 100, 200, 300.

Specifically, in some embodiments the drone 400 includes the housing 112, wing assemblies 114, controller 150, image sensor assembly 160, and proximity sensor 162 each being as previously described above. In addition, drone 400 includes a sand rake assembly 420 coupled to the housing 112. As will be described in more detail below, the sand rake assembly 420 is configured to rake and level sand within a bunker of a golf course. For instance, when a golfer hits a golf ball out of a bunker, craters and other discontinuities are formed in the surface of the sand therein as a result of impact of the ball and club with the sand and as a result of footprints formed when the golfer moved into, about, and out of the bunker during play. These surface discontinuities can cause play within the bunker by a subsequent golfer more difficult. As a result, the sand should be raked following play out of the bunker to ensure that the next golfer has a relatively smooth and continuous sand surface for fair play. Because golfers routinely fail to rake bunkers (either due to forgetfulness or willful disregard) the sand within bunkers may often be uneven and non-uniform for many golfers during a day of play. As a result, the done 400 shown in FIG. 14 may largely automate bunker raking to ensure a more uniform sand surface for golfers.

The sand rake assembly 420 includes a rake 430 and an actuator 422 that is configured to selectively deploy the rake 430 from the housing 112 during operations. The rake 430 includes a head 434 that further includes a plurality of tines 436. In addition, the rake 430 includes an elongate rod or pole 432 having a longitudinal axis 435, a first or inner end 432a, and a second or outer end 432b opposite inner end 432a. The outer end 432b is coupled to the head 434 via a swivel connector 440 that is configured to allow the head 434 to pivot relative to the pole 432 about axis 435. In particular, the swivel connector 440 may include one or more bearings (such as ball bearings) that are configured to allow head 434 to rotate or pivot about axis 435 relative to pole 432 during operations. In addition, the inner end 432b of pole 432 is coupled to the actuator 422 (particularly to an output shaft 423 of actuator 422) via a pinned connection 438. The pinned connection 438 may be configured to allow pole 432 to rotate or pivot about an axis of rotation 437 that is perpendicular (or orthogonal) to the longitudinal axis 435 at the inner end 432b. The swivel connector 440 and the pinned connection 438 may be more generically referred to herein as a "first connection" and a "second connection," respectively.

The actuator 422 includes the output shaft 423 as previously mentioned above. During operations, the actuator 422 is configured to selectively extend or retract the output shaft 423 in response to a command or instruction from the controller 150. In some embodiments, the actuator 422 may comprise an electrical motor (e.g., a servo motor, stepper motor, etc.), a linear actuator (e.g., a pneumatic linear actuator, hydraulic linear actuator, electric linear actuator, etc.), or any other suitable motor or driver that may extend or retract the output shaft 423 during operations.

Figure 15:
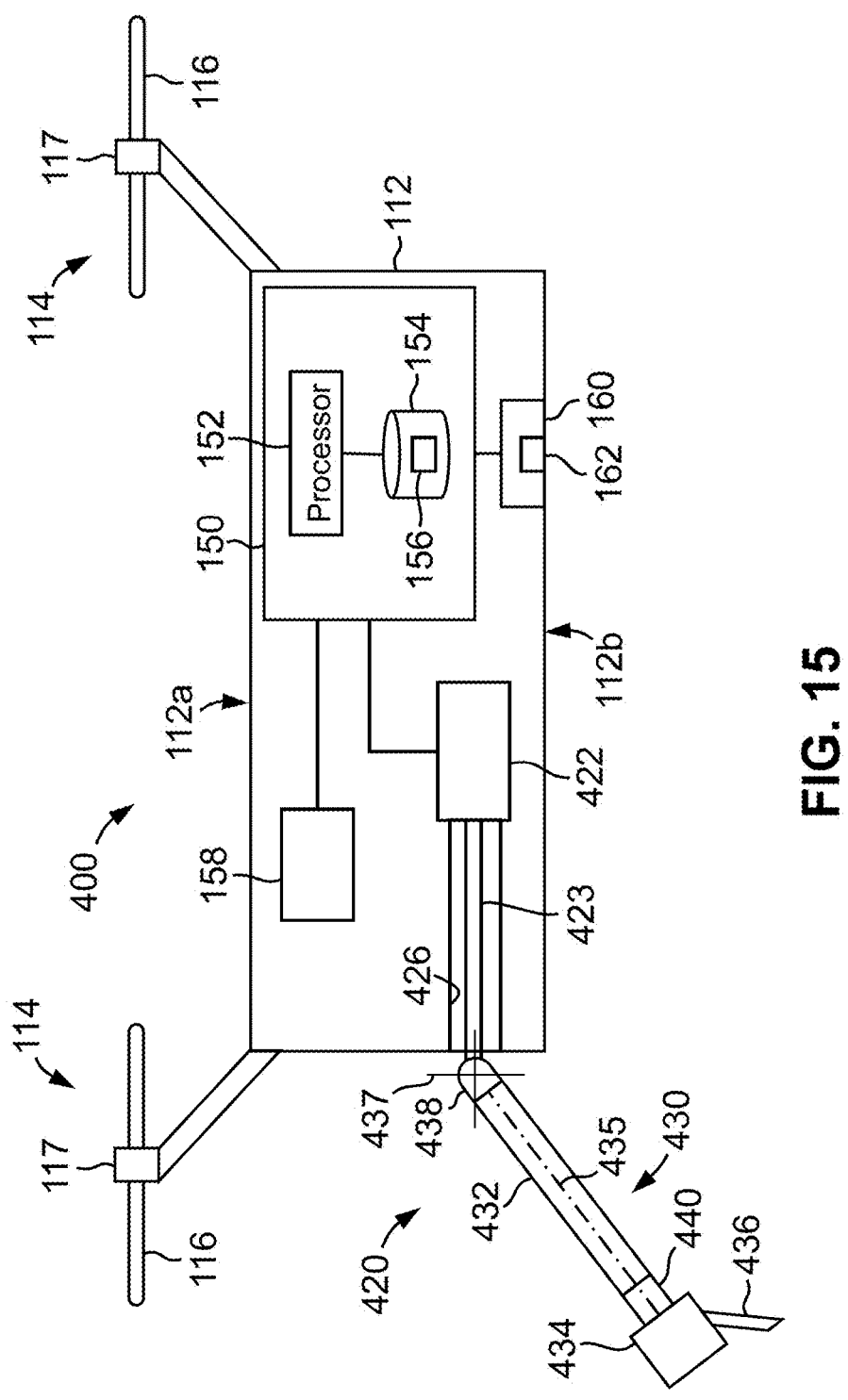
FIG. 15 is a schematic view of the golf maintenance drone of FIG. 14 with the sand rake assembly in a deployed position according to some embodiments disclosed herein.

During operations, the controller 150 may actuate the sand rake assembly 420 between a first or stowed position as shown in FIG. 14 and a second or deployed position as shown in FIG. 15. When the sand rake assembly 420 is in the stowed position (FIG. 14), the rake 430 is at least partially contained or positioned within a cavity or void 426 within the housing 112. Specifically, the actuator 422 may retract the output shaft 423 such that the pole 432 is drawn into the cavity 426. When in the stowed position, the head 434 and tines 436 may be positioned outside of the cavity 426 (and thus also outside of housing 112) such as shown in FIG. 14. In some embodiments, the head 434 may be positioned partially or fully within the cavity 426 (and thus within housing 112) when the sand rake assembly 420 is in the stowed position. In some embodiments, when the sand rake assembly 420 is in the stowed position, the outer end 432a and potentially the swivel connector 440 may be positioned in the cavity 426 (and thus may be positioned within the cavity 426 and housing 112), or (as is shown in FIG. 14) may be positioned outside of cavity 426 and housing 112.

As shown in FIG. 15, when the sand rake assembly 420 is in the deployed position, the rake 430 is extended out of the cavity 426 of housing 112 so that tines 436 of head 434 may engage with the sand within a bunker. Specifically, the actuator 422 may extend the output shaft 423 so that the pole 432 is translated out of the cavity 426. Once the pinned connection 438 is positioned outside of the cavity 426, the pole 432 may pivot about axis of rotation 437 so as to move the head 434 and tines 436 generally downward and toward the ground below the drone 400 (and away from the lower side 112b of housing 112). When the sand rake assembly 430 is in the deployed position (FIG. 15), the drone 400 may maneuver around and/or within a bunker so as to drag the tines 436 through the sand.

Figure 16:
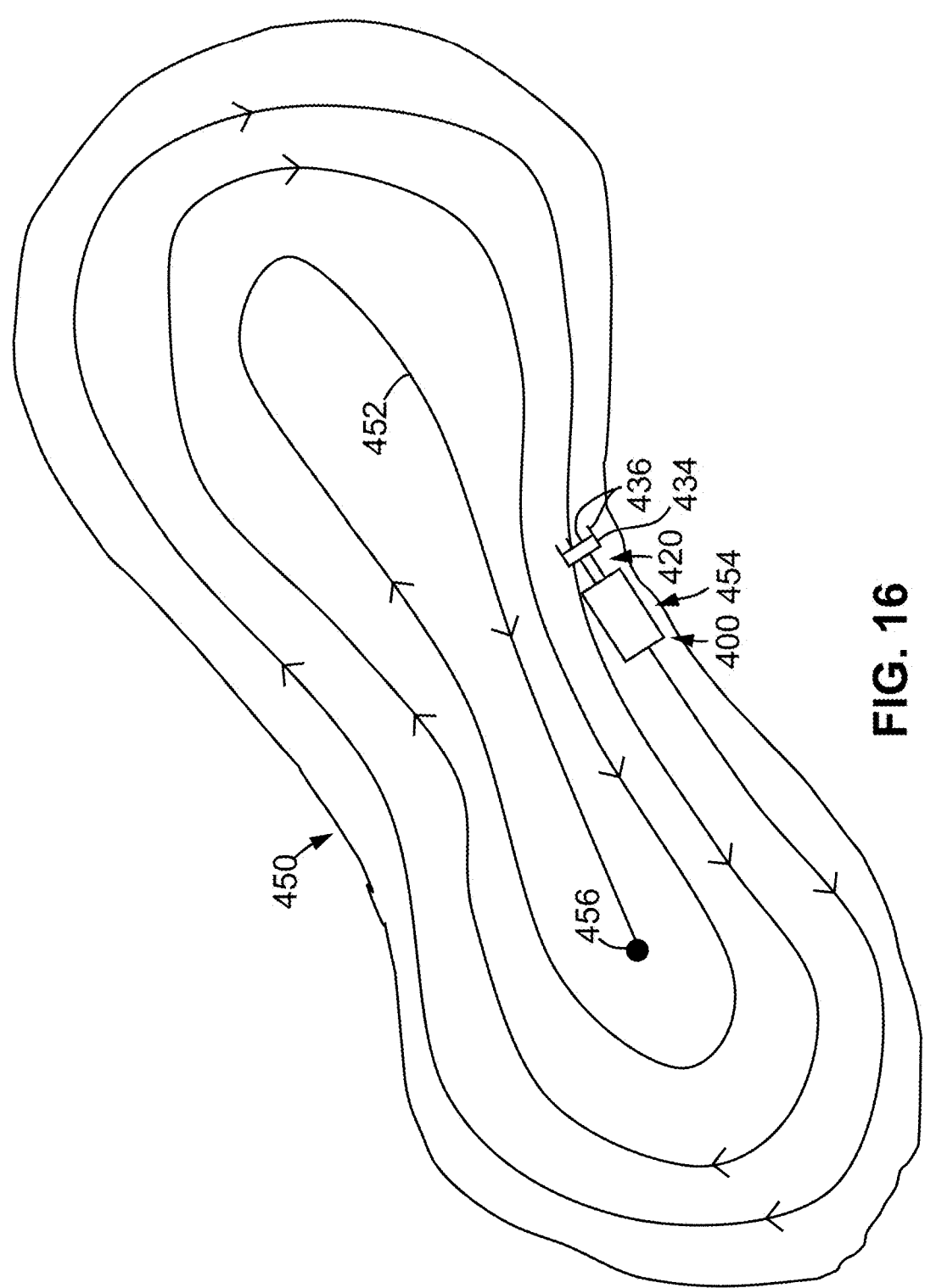
FIG. 16 is a top schematic view showing an example path for the golf maintenance drone of FIG. 14 within a bunker according to some embodiments disclosed herein.

For instance, as shown in FIG. 16, in some embodiments, the done 400 may fly about a bunker 450 with the sand rake assembly 430 in the deployed position (FIG. 15) such that the tines 436 are dragged or pulled through the sand of the bunker 450 via a spiraling, arcuate path that follows an edge (or perimeter) of the bunker in adjacent rows or lines until the done 400 reaches an ending point at or near a center of the bunker 450. The path 452 may be arranged and configured to ensure that tines 436 are pulled across the entire (or almost the entire) surface of the sand within the bunker 450 during operations. In some embodiments, the path 452 may be altered depending on a shape, size, and position of the bunker 450 during operations. For instance, in some embodiments, the drone 400 may fly about the bunker 450 such that the tines 436 are pulled across the surface of the sand therein from the point 456 to the point 454. In some embodiments, the drone 400 may fly in alternative patterns within the bunker 450 from that shown in FIG. 16. For instance, in some embodiments, the done 400 may fly in parallel, adjacent paths from a first end of the bunker 450 to a second, opposite end of the bunker 450. Still other paths for the drone 400 are contemplated for other embodiments.

In some embodiments, the controller 150 may utilize GPS (or other locating system) to navigate the drone 400 to the one or more bunkers (e.g., bunker 450 shown in FIG. 16) during operations. For instance, the drone 400 may include a GPS antenna (not shown) for communicating with the GPS system during operations. In addition, the controller 150 may utilize a map (such as a 3D map as described below) of the golf course to navigate throughout the course and locate bunkers 450 for raking during operations. For instance, the controller 150 may utilize the detailed information available in such a map (e.g., the designed size, location, contours, elevation, slopes, etc. of the bunker(s) 450) to locate bunkers 450 and even to automatically detect the anomalies (e.g., discontinuities in the surface of the sand) which may indicate the need for bunker raking. In one example, drone 400 may identify that a bunker is need of raking by comparing the current contours and slope of the sand within the bunker (e.g., via measurements made by the proximity sensor 162 and/or images captured by the image sensor assembly 160) with the designed or intended contours and slope of the bunker from the 3D map (which may be saved on memory 154 or another memory device that is communicatively coupled to the processor 152). The controller 150 may identify anomalies in the sand surface based on the comparison and may determine that the bunker 450 is to be raked via the sand rake assembly 420 as previously described above.

Referring again to FIG. 15, as the drone 400 is maneuvered about the bunker (bunker 450 shown in FIG. 16) to drag the tines 436 across the sand therein, the head 434 may freely pivot about the axis 435 relative to pole 432 via swivel connector 440. As a result, the head 434 may pivot to accommodate contours and other elevation changes (e.g., such as sloped side walls) within the bunker during operations.

Figure 17:
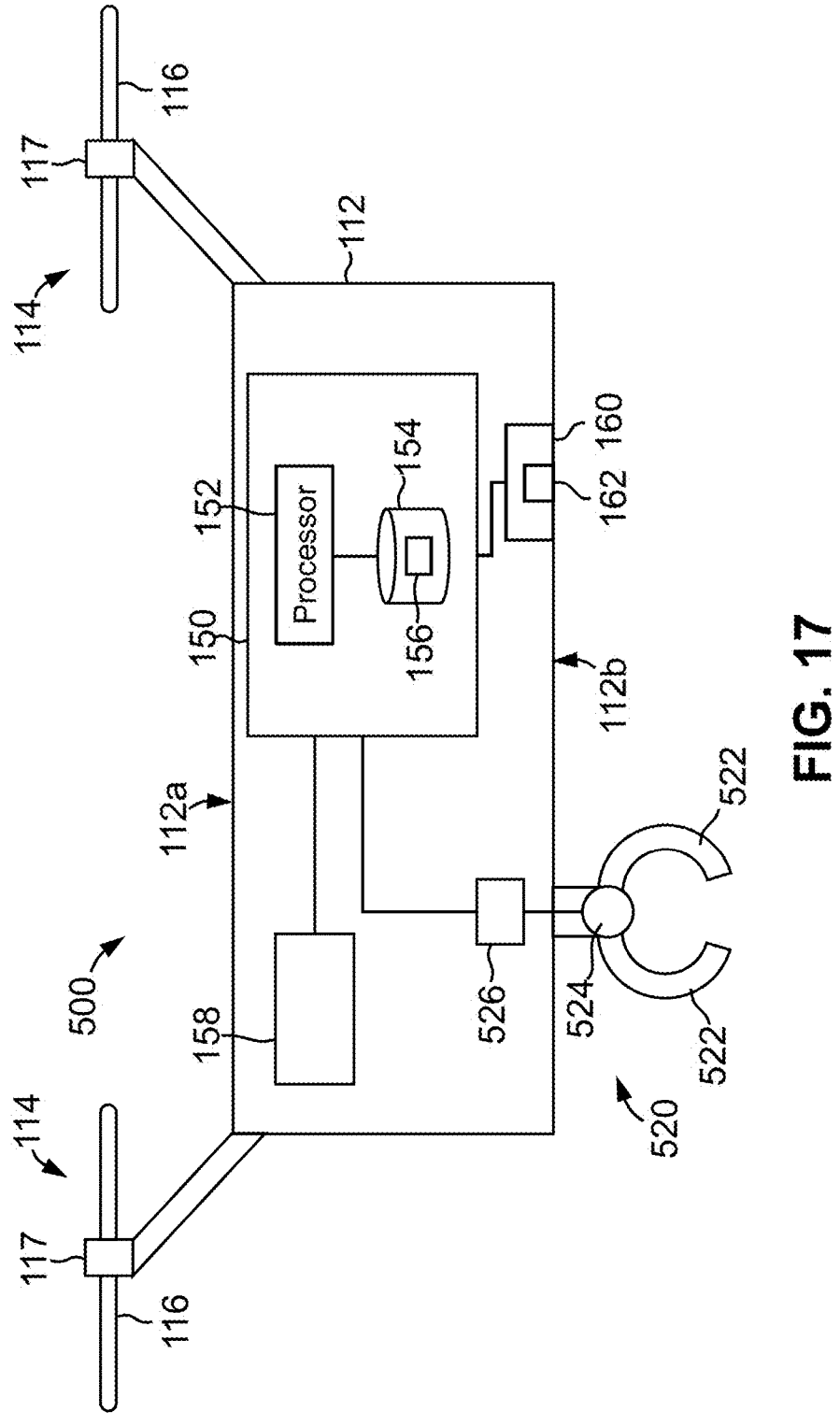
FIG. 17 is a schematic view of a golf maintenance drone according to some embodiments disclosed herein.

Referring now to FIG. 17, another golf maintenance drone 500 (or more simply "drone" 500) is shown according to some embodiments. As will be described in more detail below, the drone 500 may be configured to autonomously locate and pick up debris (e.g., tree limbs, trash, golf clubs, club head covers, etc.) from a golf course during operations. As used herein, the term "debris" is broadly used to refer to both trash or other unwanted items such as tree limbs, brush, wrappers, cans, etc., as well as lost items (including valuable items) such as clubhead covers, clubs, range finders, jewelry, etc. The drone 500 may include a number of shared features and components with the drones 100, 200, 300, 400. These shared components are identified in the drawings with the same reference numerals and are the same as previously described above for drones 100, 200, 300, 400. In addition, the description below will generally focus on the features of drone 500 that are different from the drones 100, 200, 300, 400.

Specifically, in some embodiments the drone 500 includes the housing 112, wing assemblies 114, controller 150, image sensor assembly 160, and proximity sensor 162 each being as previously described above. In addition, drone 500 includes a debris collection assembly 520 coupled to the housing 112. As will be described in more detail below, the debris collection assembly 520 is configured to collect and remove debris from of a golf course. For instance, debris, such as golf clubs, club head covers, tree limbs, trash, etc., may be deposited on a golf course and may interfere with play of golfers. As a result, drone 500 may collect and remove debris from on the golf course to avoid these issues.

For instance, as shown in FIG. 17, debris collection assembly 520 may include a one or more fingers 522 that may be rotated toward and away from one another about a hinge 524. Specifically, the fingers 522 rotated toward one another about the hinge 524 to close the fingers 522 about debris and may be rotated away from one another about the hinge to open the fingers 522 to receive therebetween or release debris therefrom. The fingers 522 may be rotated about the hinge 524 to selectively open or close the fingers 522 via a motor or driver 526, which may comprise an electric motor (e.g., a stepper motor, servo motor, etc.), hydraulic motor, pneumatic motor, etc. The motor 526 may be coupled to the controller 150 so that the controller 150 may actuate the motor 526 to open and close the fingers 522 during operations.

Figure 18:
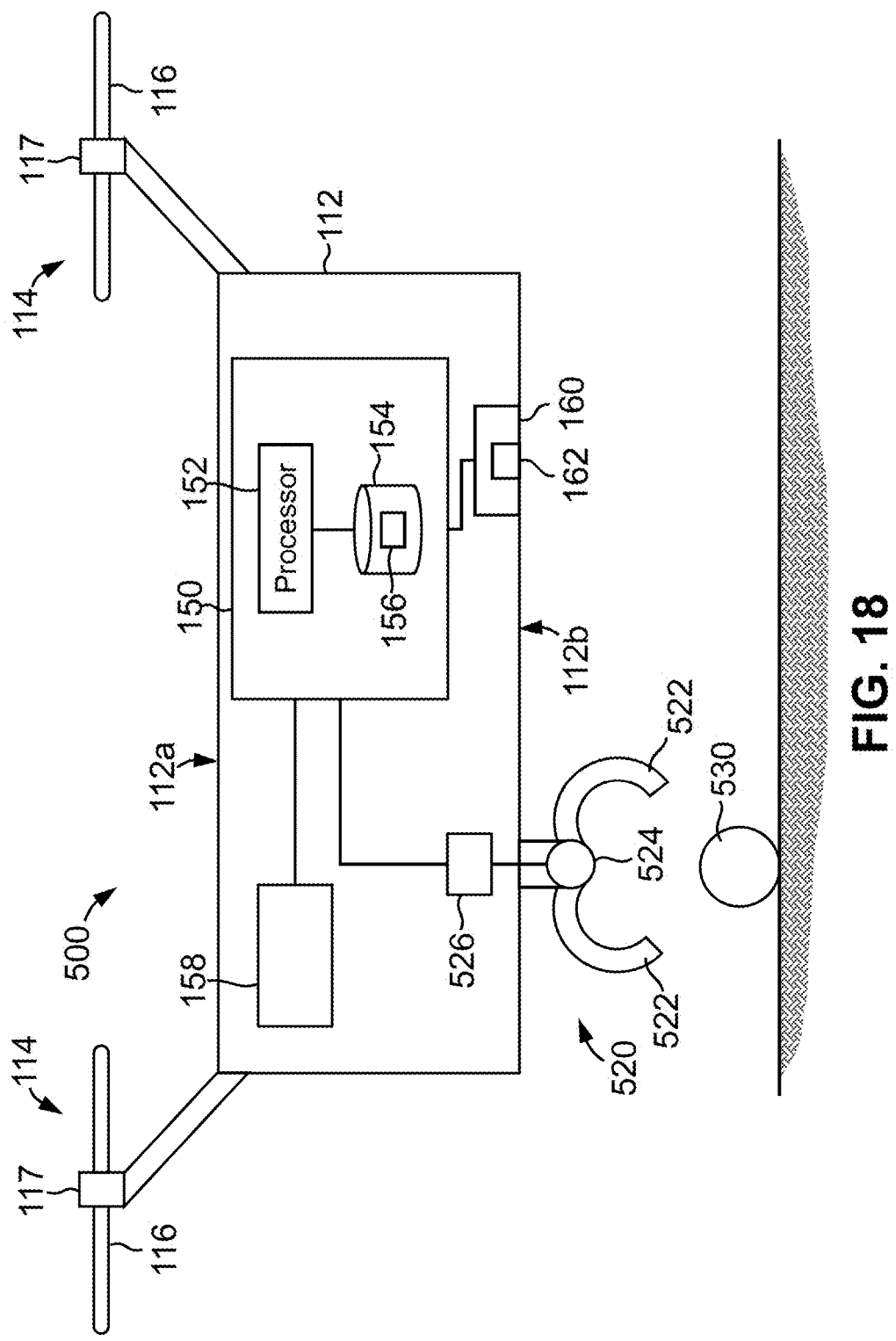
FIGS. 18 and 19 are sequential schematic views of the golf maintenance drone of FIG. 17 performing a debris collection operation according to some embodiments disclosed herein.
Figure 19:
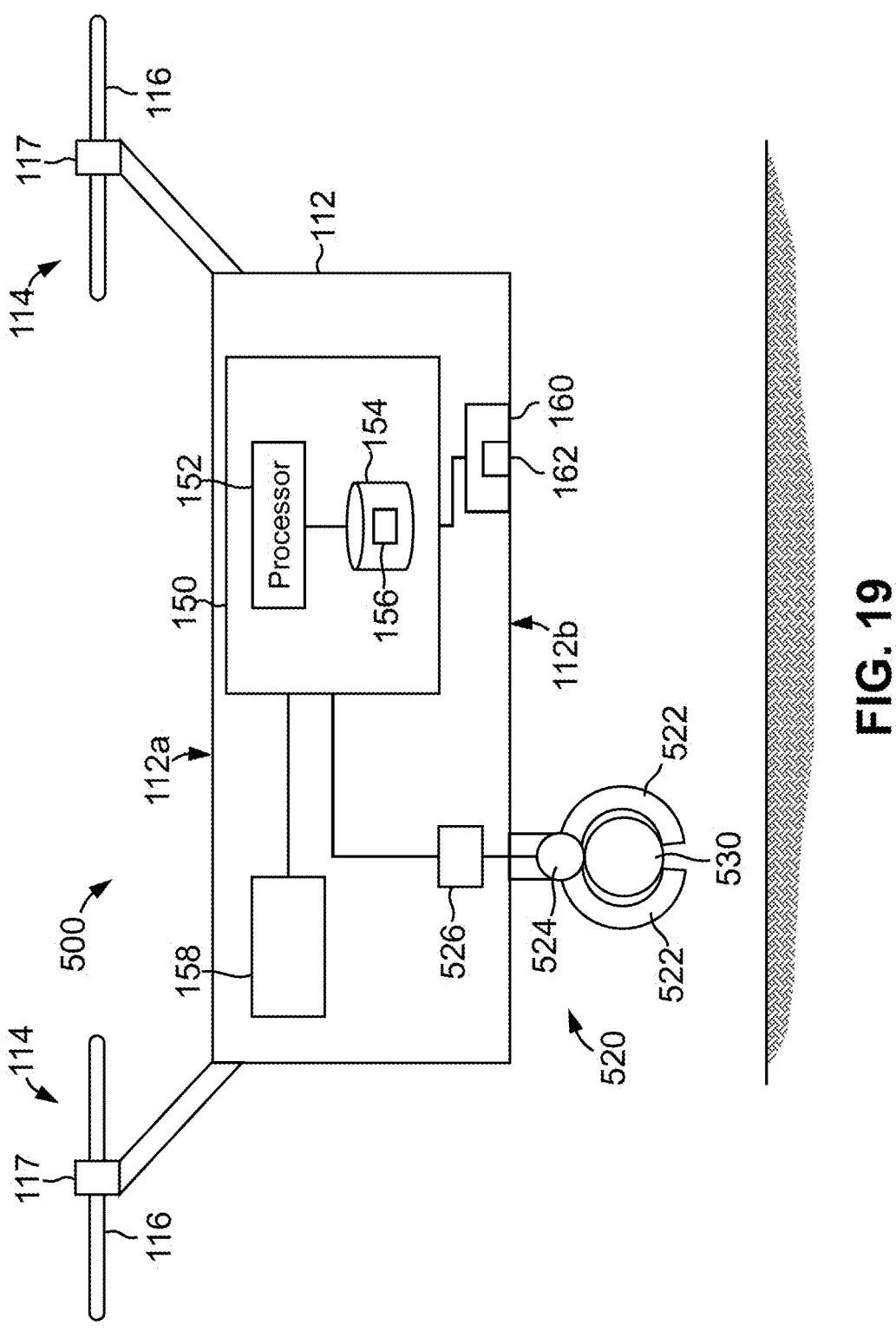

Specifically, as shown in FIGS. 18 and 19, during operations, drone 500 may autonomously operate to locate and remove debris on the golf course. For instance, controller 150 may maneuver drone 500 such that the debris collection assembly 520 (and particularly fingers 522) are positioned over debris 530 that is on the golf course. As previously described, the debris 530 can include any object or item positioned on the golf course grounds that should not be there. For instance, debris 530 can include trash that is discarded by a golfer, a golf club that is inadvertently left on the golf course, a tree limb, etc. As shown in FIG. 18, once the drone 500 is positioned over the debris 530, the controller 150 may open the fingers 522 (e.g., by rotating fingers 522 about hinge 524 via motor 526) and the drone 500 so that the debris 530 is received between the open fingers 522. Thereafter, as shown in the sequence from FIG. 18 to FIG. 19, the controller 150 may close the fingers 522 about the debris 530 (e.g., by rotating fingers 522 about hinge 524 via motor 526) so that the debris 530 may be captured by the fingers 522 and therefore carried away by the drone 500.

In some embodiments, the debris 530 may be deposited by the drone 500 in a designated collection area (e.g., container, surface, or other suitable location). Thereafter, personnel may determine how the particular debris 530 may be further processed. For instance, if the debris 530 is trash or tree limbs, personnel may place the collected debris 530 in an appropriate waste bin. In another example, if the collected debris is a golf club, then personnel may retrieve the retrieved golf club from the collection area and deliver it to an appropriate location (e.g., a lost and found, the club house, etc.) where it may be recovered by the golfer who initially left the golf club on the course.

In some embodiments, the drone 500 may locate and identify debris 530 using images captured by the image sensor assembly 160. For instance, the controller 150 may locate and identify debris 530 on the golf course by inputting the images captured by the image sensor assembly 160 (or information indicative thereof) into a machine learning model (e.g., a logistic regression model, a classification model, a neural network, etc.) which may then provide an indication of the identification of the debris 530. Based on the identification of the debris, the controller 150 may the cause the drone 500 to collect the identified debris 530 via the debris collection assembly 520 and then deposit the debris in a suitable location (e.g., a waste bin, the club house, a lost and found, etc.). In some embodiments, the drone 500 (or more particularly the controller 150) may compare image(s) captured by the image sensor assembly 160 and/or measurements taken by the proximity sensor 162 to known elevations, contours, slopes, or other features of the golf course that may be derived from a detailed 3D map thereof (as described herein). The drone 500 may identify debris (or other anomalies) based on the comparison and may then remove the identified debris via the debris collection assembly 520 as previously described.

In some embodiments, the drone 500 may be utilized to deliver and/or retrieve other objects from a golf course. For instance, in some embodiments, the drone 500 may be configured to remove or retrieve flagsticks, tee box markers, yardage stakes, sponsor signs (e.g., for tournaments), competition markers (e.g., longest drive, closest to the pin, etc.).

During operations, the drones 100, 200, 300, 400, 500 may be deployed from a central base station to perform the various golf maintenance activities described herein (e.g., divot filling, pitch mark repair, bunker raking, debris retrieval, etc.). For instance, the central base station may be positioned at a club house, maintenance shed, or other suitable location on or near the golf course. In some embodiments, the drones 100, 200, 300, 400, 500 may be deployed before play begins on the golf course (e.g., such as in the early morning before a first tee time on the golf course), after play finishes (e.g., such as after the last tee time of the day), and/or during play (e.g., such as between golfers or golfer groups or contemporaneously during play of a golfer or golfer group).

Figure 20:
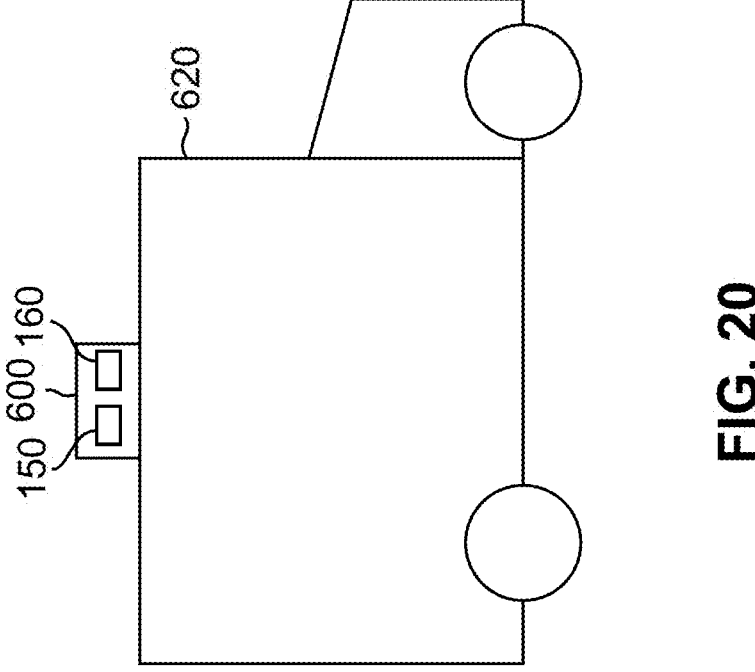
FIG. 20 is a schematic view showing a golf maintenance drone that is deplorable from a golf cart according to some embodiments disclosed herein.

In some embodiments, a drone (e.g., such one or more of the drones 100, 200, 300, 400, 500) may accompany a golfer or golfer group during play so as to perform golf maintenance activities throughout the golfer or golfer group's round. For instance, as shown in FIG. 20, a drone 600 (which may comprise one of the drones 100, 200, 300, 400, 500 or a combination thereof) may be positioned on (e.g., atop) a golf cart 620. During operations, the drone 600 may deploy from the golf cart 620 to perform golf maintenance activities. For instance, a golfer may command the drone 600 (e.g., via a suitable user interface such as tough panel, remote, keyboard, button, smartphone, or other suitable interface device) to perform one or more golf course maintenance activities when desired.

In one particular example, a golfer may command the drone 600 to fill a divot following a shot off of a fairway of the golf course. Upon receiving the command, the drone 600 may take off and scan an area immediately surrounding the golf cart 620 for a divot or plurality of divots (e.g., divots 5 shown in FIGS. 2-5). The drone 600 may fly a predetermined pattern in the area surrounding the golf cart 620 or about an area surrounding another marker (e.g., such as a fob or other signal emitting device) and may perform divot locating and identification as well as divot filling operations in the manner previously described herein.

In another particular example, a golfer may command (e.g., via a suitable user interface as previously described) the drone 600 to repair pitch marks on a green (e.g., green 17) of the golf course. For instance, the drone 600 may locate and identify pitch marks on a green that is located closest to the done 600 (e.g., via a GPS as previously described) upon receiving the command from the golfer. The drone 600 may locate and repair pitch marks in the manner previously described herein.

In still yet another particular example, a golfer may comment (e.g., via a suitable user interface as previously described) the drone 600 to rake a bunker on the golf course. Again, the drone 600 may locate and identify a bunker for raking that is closest to the drone 600 (e.g., via a GPS as previously described) upon receiving the command from the golfer. In some embodiments, the drone 600 may locate and identify a bunker for raking that is closest to another marker (e.g., such as a fob or other signal emitting device). The drone 600 may perform sand raking within the designated bunker in the manner previously described herein.

In some embodiments, the drone 600 may automatically (or semi-automatically) deploy from the cart 620 to perform golf maintenance activities. For instance, in some embodiments a camera on or coupled to the drone 600 (e.g., image sensor assembly 160) may capture images of a golfer performing a shot. The images captured by the camera (or information indicative of the images) may be communicated to the controller 150 which may then determine that a shot has been performed and that golf maintenance activities may be necessary (e.g., divot filling, pitch mark repair, bunker raking, debris removal, etc.). The controller 150 on the drone 100 may utilize any suitable technique for recognizing a shot in the images (or information indicative of the images). For instance, in some embodiments, the controller 150 may utilize a machine-learning model to recognize a shot in the images (or information indicative of the images).

Figure 21:
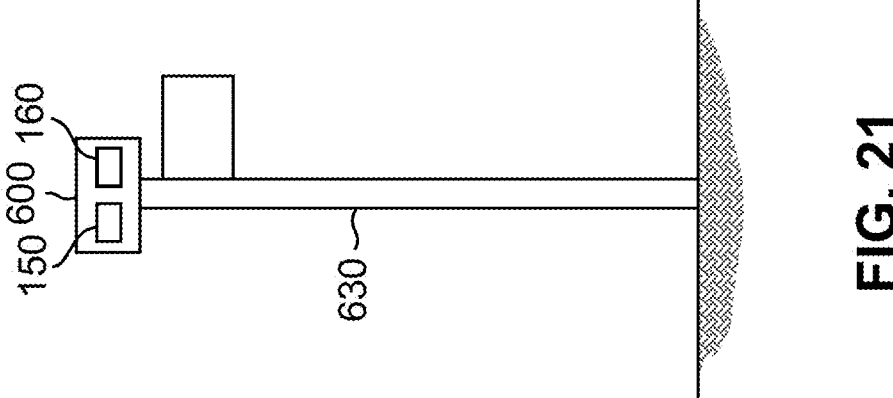
FIG. 21 is a schematic view showing a golf maintenance drone that is deployable from a flagstick according to some embodiments disclosed herein.

As shown in FIG. 21, in some embodiments, the drone 600 may be positioned atop or otherwise on a flagstick 630 marking the hole on a green 17 of the golf course. During operations, the drone 600 may deploy from the flagstick 630 to perform golf course maintenance (e.g., divot filling, pitch mark repair, sand trap raking, etc.) on command (e.g., by a golfer), or automatically. For instance, in some embodiments, drone 600 may deploy from flagstick 630 automatically by recognizing when a ball has been hit into the green (e.g., via images or related information captured by a camera coupled to or onboard the drone 600 as previously described). In one particular example, the drone 600 may deploy from the flagstick 630 and may perform pitch mark repairs on the green 17. For instance, the drone 600 may deploy from flagstick 630 and fly about the associated green 17 to locate, identity, and repair pitch marks thereon in the manner previously described herein.

While the embodiments of drones 100, 200, 300, 400, 500 described herein have each included a particular assembly for performing a particular aspect or task of golf course maintenance (e.g., divot fill assemblies 120, 220, pitch mark repair assembly 320, and sand rake assembly 420, debris collection assembly 520), other embodiments of drones contemplated herein may include a combination of assemblies such that an embodiment of a done described herein may be configured to perform multiple aspects or tasks of golf course maintenance. For instance, in some embodiments, a drone may include both the sand rake assembly 420 and the pitch mark repair assembly 320 such that the drone may perform both pitch mark repairs on a green 17 as well as sand trap raking (e.g., such as for greenside bunkers). In another embodiment, a drone may include both the sand rake assembly 420 and a divot fill assembly (e.g., divot fill assembly 120, divot fill assembly 220, etc.) such that the drone may perform both divot filling and sand trap raking (e.g., such as for fairway bunkers). Still other combinations of assemblies for performing golf course maintenance tasks are contemplated for other embodiments of drones disclosed herein. The assemblies and devices included with the drone 100, 200, 300, 400, 500 for performing the golf course maintenance tasks described herein, such as the divot fill assemblies 120, 220, pitch mark repair assembly 320, and sand rake assembly 420, debris collection assembly 520, may be collectively referred to as "golf maintenance assemblies."

FIGS. 22-25 show example methods of performing golf course maintenance tasks using a drone according to some embodiment disclosed herein. The methods shown in FIGS. 22-25 may be performed using embodiments of the drones 100, 200, 300, 400, 500 described herein. Thus, in describing the methods of FIGS. 22-25, continuing reference will be made to FIGS. 1-21. However, it should be appreciated that the methods shown in FIGS. 22-25 may be practiced using other embodiments of drones that may be different (in at least some respects) than the drones shown in FIGS. 1-21. As a result, the reference to features and components shown in FIGS. 1-21 should not be interpreted as limiting all potential embodiments of the methods shown in FIGS. 22-25.

Referring now to FIG. 22, a method 700 of filling a divot on a golf course is shown according to some embodiments. Initially method 700 includes maneuvering a drone to a divot on a golf course at block 702. For instance, as was previously described above for the drones 100, 200 shown in FIGS. 1 and 7, respectively, the drones may be flown and maneuvered to a divot 5 on the golf course by actuating one or more wing assemblies 114 coupled to a housing 112 of the drone 100, 200. In some embodiments, the drone 100, 200 (or a controller 150 thereof) may locate and identify the divot using one or more images captured by an image sensor assembly 160 coupled to the drone as previously described.

In addition, method 700 includes dispensing a filler material into the divot at block 704. For instance, as was previously described above for the drones 100, 200 shown in FIGS. 1 and 7, respectively, the filler material may be dispensed from a dispenser tube 126 extending out of a reservoir 122 coupled to the drone 100, 200. The filler material may be dispensed from the dispenser tube 126 by rotating an auger 127 that is positioned within the dispenser tube 126. In some embodiments, the filler material may comprise sand and potentially other constituents (e.g., grass seed, fertilizer, etc.).

Further, method 700 includes leveling the filler material within the divot with the drone at block 706. In some embodiments, leveling the filler material may comprise leveling the filler material with the turf surrounding the divot. As was previously described above for the drones 100, 200 shown in FIGS. 1 and 7, respectively, the drone 100, 200 may include a leveling device 140, 240 that may be engaged with the filler material within the divot 5 to level the filler material with the surrounding turf 7. For instance, in some embodiments, the leveling device 140 may comprise a flap of material that is dragged across the divot 5 after the filler material has been dispensed therein. In some embodiments, the leveling device 240 may comprise a plate 242 that may be engaged with the filler material and the surrounding turf to tamp down and level the filler material within the divot 5.

Referring now to FIG. 23, a method 750 of repairing a pitch mark on a golf course is shown according to some embodiments. Initially, the method 750 includes maneuvering a drone to a pitch mark on the golf course at block 752. For instance, as was previously described above for the drone 300 shown in FIG. 11, the drone may be flown and maneuvered to a pitch mark 15 on the golf course by actuating one or more wing assemblies 114 coupled to a housing 112 of the drone 300. In some embodiments, the drone 300 (or a controller 150 thereof) may locate and identify the pitch mark using one or more images captured by an image sensor assembly 160 coupled to the drone as previously described.

In addition, method 750 includes engaging the pitch mark with a plurality of prongs coupled to the drone to lift the soil within the pitch mark at block 754. For instance, as was previously described above for the drone 300 shown in FIG. 11, the prongs 330 may be angled to converge toward one another so that when the prongs 330 are inserted into the ground, about the pitch mark 15, the soil is lifted by the prongs to thereby repair and uncompact the pitch mark 15.

Further, method 750 includes leveling the lifted soil with a plate coupled to the drone at block 756. For instance, as was previously described above for the drone 300 shown in FIG. 11, as the prongs 330 are inserted into the ground about the pitch mark 15, the leveling plate 328 also engages with the ground so as to level the lifted soil with the surrounding turf of the green 17.

Figure 24:
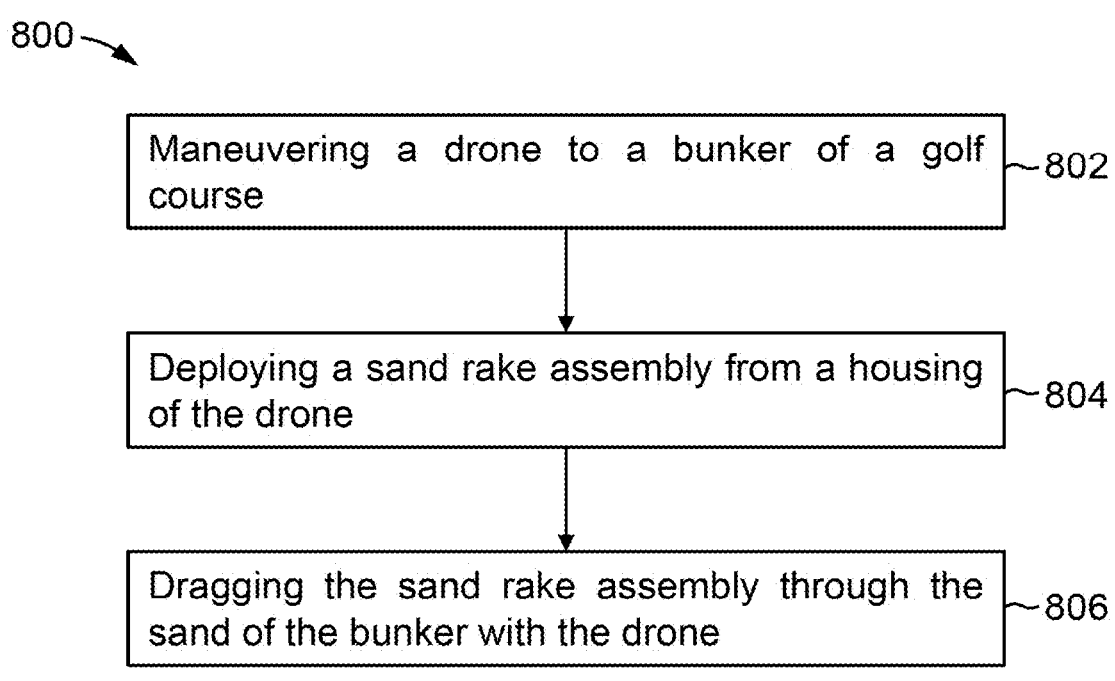

Referring now to FIG. 24, a method 800 of raking a bunker of a golf course is shown according to some embodiments. Initially, method 800 includes maneuvering a drone to a bunker of a golf course at block 802. For instance, as was previously described above for the drone 400 shown in FIG. 14, the drone 400 may be flown and maneuvered to a bunker on the golf course by actuating one or more wing assemblies 114 coupled to a housing 112 of the drone 400.

In addition, method 800 includes deploying a rake assembly from a housing of the drone at block 804. For instance, as was previously described above for the drone 400 shown in FIG. 14, the rake 430 may be deployed from a cavity 426 in the housing 112 of the drone 400 via actuation of actuator 422 and extension of output shaft 423 as previously described. Once the deployed, the rake 430 may extend downward from a lower side 112b of the housing 112.

Further, method 800 includes dragging the sand rake assembly through the sand of the bunker with the drone at block 806. For instance, as was previously described above for the drone 400 shown in FIG. 14, the done may drag the tines 436 coupled to the head 434 through the sand within the bunker so as to level the sand and allow for a smooth, generally continuous surface throughout. As previously described, the head 434 may pivot about a longitudinal axis 435 of a pole 432 of the rake 430 and the pole 432 may pivot about a pinned connection 438 so that the rake 430 may accommodate elevation and slope changes within the bunker as the rake 430 is dragged therethrough via the drone 400.

Figure 25:
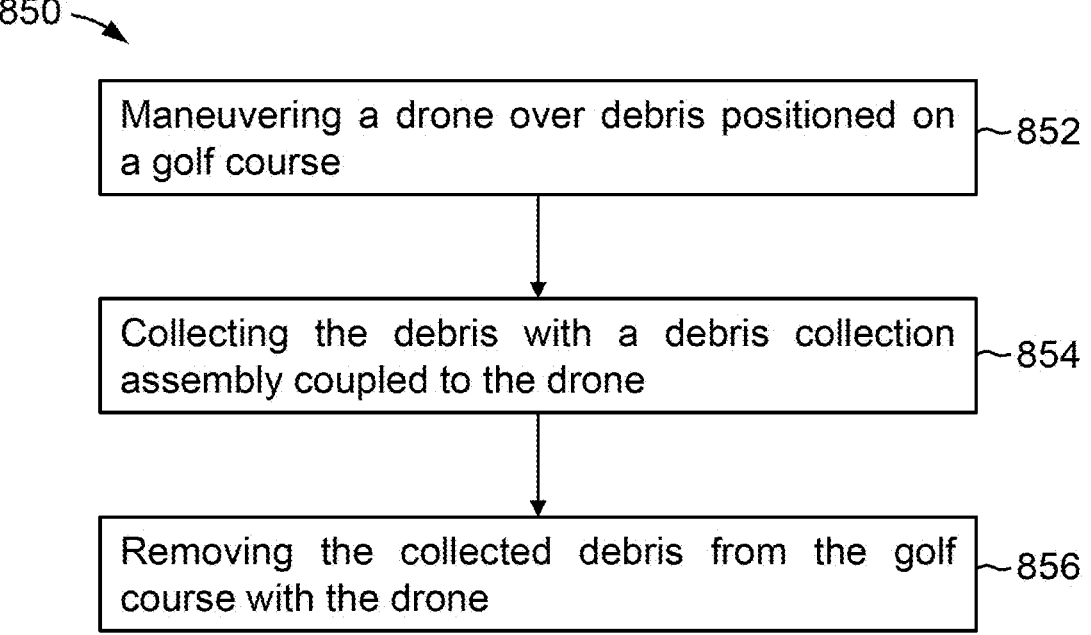

Referring now to FIG. 25, a method 850 of collecting and removing debris from a golf course is shown according to some embodiments. Initially, method 850 includes maneuvering a drone over debris positioned on a golf course at block 852. For instance, as was previously described above for the drone 500 shown in FIG. 17, the drone 500 may be flown and maneuvered to debris 530 on the golf course by actuating one or more wing assemblies 114 coupled to a housing 112 of the drone 500. In some embodiments, the drone 500 (or a controller 150 thereof) may locate and identify the debris 530 using one or more images captured by an image sensor assembly 160 coupled to the drone 500 as previously described.

In addition, method 850 includes collecting the debris with a debris collection assembly coupled to the drone at block 854 and removing the collected debris from the golf course with the drone at block 856. For instance, as was previously described above for the drone 500 shown in FIG. 17, the debris 530 may be collected and removed from the golf course by closing a plurality of fingers 522 of the debris collection assembly 520 and then flying the collected debris 530 to a suitable location via the drone 500. In some embodiments, the drone 500 may identify the debris on the golf course using one or more images captured by the image sensor assembly 160 coupled to the drone 500 as previously described.

The embodiments disclosed herein are directed to drones configured to perform golf course maintenance. In some embodiments, the drones may include one or more tools and assemblies that may be used to autonomously perform golf course maintenance operations such as, for instance, filling divots, fixing pitch or ball marks on the green, raking sand traps, and removing debris from the course. Thus, through use of the embodiments disclosed herein, golf course maintenance may be performed more efficiently and consistently without the need to hire and train a large grounds keeping crew.

While embodiments of drones described herein have been configured to perform golf course maintenance tasks (e.g., filling divots, repairing pitch marks, raking bunkers, removing debris, etc.), other embodiments may employ similar drones (e.g., similar to the drones 100, 200, 300, 400, 500) for performing other tasks. For instance, the drones 100, 200 may be configured to fill potholes on a road surface. In addition, in some embodiments, the drone 500 may be configured to remove debris from a roadway (e.g., tire parts, litter, etc.).

As previously described herein, in some embodiments, embodiments of the drones described herein (e.g., drones 100, 200, 300, 400, 500, 600) may identify divots, pitch marks, debris, unraked bunkers, or other "anomalies" by comparing images (and/or information indicative of or derived from images) captured by the image sensor assembly 160 and/or information obtained by the proximity sensor 162 to a stored map or layout of the golf course (e.g., stored in memory 154). For instance, a drone (e.g., drones 100, 200, 300, 400, 500, 600) may be loaded or otherwise supplied with a detailed map (such as a 3D map) of the golf course (or a portion of the golf course), and controller 150 of the drone may be configured to compare images of the golf course captured by image sensor assembly 160 to the stored 3D map to identify anomalies. Specifically, a drone (e.g., drones 100, 200, 300, 400, 500, 600) may compare the captured images and possibly corresponding measurements or other information obtained by the proximity sensor 162 to known sizes, contours, slopes, etc. derived from the 3D map to identify and/or locate anomalies on the golf course during operations.

In some embodiments, the controller 150 may be configured to identify anomalies which may call for direct personnel intervention, such as, for instance ant mounds. For example, the controller 150 may note the location of the ant mound (or other anomaly) and then deliver an alert or other suitable message to personnel (e.g., via the drone or another electronic device that is communicatively coupled to the drone) so as to indicate to the personnel that some action should be taken with respect to the identified anomaly (e.g., ant mount treatment or removal). In some embodiments, if an ant mound is identified on a golf course, an embodiment of a drone as described herein, such as for instance, the drone 100 shown in FIG. 1, may drag the leveling device 140 across the identified ant mound.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A golf course maintenance drone for performing maintenance tasks on a golf course, the drone comprising:
a housing;
a wing assembly coupled to the housing, the wing assembly including a propeller that is configured to provide lift to the housing; and
a golf course maintenance assembly coupled to the housing that is configured to fill divots on the golf course, wherein the golf course maintenance assembly comprises:
a reservoir configured to hold filler material; and
a leveling device configured to level the filler material dispensed into a divot from the reservoir.

2. The drone of claim 1, further comprising:
an image sensor assembly configured to capture an image of turf of a golf course positioned below the housing; and
a controller coupled to the image sensor assembly, wherein the controller is configured to identify divots or pitch marks in the image captured by the image sensor assembly.

3. The drone of claim 2, wherein the controller is configured to identify divots or pitch marks in the image based on a brightness or contrast of pixels in the image.

4. The drone of claim 3, wherein the golf course maintenance assembly comprises:

an auger coupled to the reservoir, wherein rotation of the auger is configured to dispense the filler material out of the reservoir.

5. The drone of claim 4, wherein the golf course maintenance assembly further comprises a dispenser tube including a first end positioned within the reservoir and a second end positioned outside of the reservoir, wherein the auger is inserted within the dispenser tube.

6. The drone of claim 5, wherein the auger comprises a shaft and one or more helical vanes extending outward from the shaft, and wherein the shaft has a central axis that is at a non-zero angle to a direction of gravity.

7. The drone of claim 5, further comprising:

a door coupled to the second end of the dispenser tube, wherein the door is configured to be selectively opened to dispense filler material from the dispenser tube.

8. The drone of claim 4, wherein the controller is configured to:

determine a size of a divot by use of at least images captured by the image sensor assembly;

determine a volume of filler material to fill the divot based on the size; and dispense the volume of filler by use of the auger.

9. The drone of claim 8, further comprising a proximity sensor, wherein the controller is configured to determine the size of the divot additionally by use of at least the proximity sensor.

10. The drone of claim 9, wherein the controller is configured to determine the size of the divot by:

determining a surface area of the divot by use of the images captured by the image sensor assembly;

determining a depth of the divot by use of the proximity sensor; and determining the size of the divot based on the surface area and the depth.

11. The drone of claim 2, further comprising:

a proximity sensor assembly coupled to the housing, wherein the proximity sensor assembly is configured to detect a distance between the drone and an object of interest.

12. The drone of claim 1, wherein the leveling device includes a flap of material that extends outward from the housing such that the leveling device is configured to level the filler material in the divot when the leveling device is dragged across the divot.

13. The drone of claim 1, wherein the golf course maintenance assembly comprises:

a plate including one or more apertures; and a plurality of prongs extending outward from the housing, through the one or more apertures, wherein the plurality of prongs converge toward one another.

14. The drone of claim 1, wherein the golf course maintenance assembly comprises:

a rake including a head having a plurality of tines; and an actuator configured to transition the rake between a stowed position in which the rake is at least partially withdrawn into the housing and a deployed position in which the rake is extended outward from the housing to engage the tines with sand in a bunker.

15. The drone of claim 14, wherein the rake includes a pole coupled to the head at a first end and coupled to the actuator at a second end, wherein the second end is coupled to the actuator with a pinned connection.

16. The drone of claim 15, wherein the first end of the pole is coupled to the head with a swivel connector that is configured to allow the head to pivot relative to the pole about a longitudinal axis of the pole.

17. The drone of claim 14, further comprising:

an image sensor assembly configured to capture an image of a sand surface of the bunker positioned below the housing; and a controller coupled to the image sensor assembly, wherein the controller is configured to identify anomalies of the sand surface to be raked based on a comparison between the image captured by the image sensor assembly and a stored reference image.

18. The drone of claim 1, wherein the leveling device comprises:

a plate; and an actuator coupled to the plate and configured to move the plate away from the housing to engage with the filler material in the divot.

19. A golf course maintenance drone for performing maintenance tasks on a golf course, the drone comprising:

a housing;

a wing assembly coupled to the housing, the wing assembly including a propeller that is configured to provide lift to the housing;

a reservoir coupled to the housing, the reservoir configured to hold filler material;

an auger coupled to the reservoir, wherein rotation of the auger is configured to dispense the filler material out of the reservoir; and a leveling device configured to level the filler material dispensed into a divot from the reservoir.

20. The drone of claim 19, wherein the leveling device includes a flap of material that extends outward from the housing such that the leveling device is configured to level the filler material in the divot when the leveling device is dragged across the divot.

* * * * *